United States Patent
Hunstable

(10) Patent No.: US 12,261,486 B2
(45) Date of Patent: Mar. 25, 2025

(54) SYSTEM AND METHOD FOR AN OVERLAPPING INDEPENDENT PHASE ELECTRIC MOTOR/GENERATOR

(71) Applicant: Linear Labs, Inc., Granbury, TX (US)

(72) Inventor: Fred Eugene Hunstable, Granbury, TX (US)

(73) Assignee: Linear Labs, Inc., Granbury, TX (US)

( * ) Notice: Subject to any disclaimer, the term of this patent is extended or adjusted under 35 U.S.C. 154(b) by 0 days.

(21) Appl. No.: 18/777,388

(22) Filed: Jul. 18, 2024

(65) Prior Publication Data

US 2024/0372424 A1   Nov. 7, 2024

Related U.S. Application Data

(63) Continuation-in-part of application No. 18/610,171, filed on Mar. 19, 2024, which is a continuation of application No. 17/375,863, filed on Jul. 14, 2021, now Pat. No. 11,967,866, which is a continuation of
(Continued)

(51) Int. Cl.
| | |
|---|---|
| H02K 3/04 | (2006.01) |
| H02K 1/02 | (2006.01) |
| H02K 1/14 | (2006.01) |
| H02K 1/17 | (2006.01) |
| H02K 1/276 | (2022.01) |
| H02K 1/278 | (2022.01) |
| H02K 3/12 | (2006.01) |
| H02K 21/24 | (2006.01) |

(52) U.S. Cl.
CPC .............. *H02K 1/278* (2013.01); *H02K 1/02* (2013.01); *H02K 1/2773* (2013.01); *H02K 3/12* (2013.01); *H02K 21/24* (2013.01); *H02K 1/148* (2013.01); *H02K 1/17* (2013.01); *H02K 3/04* (2013.01); *H02K 2213/03* (2013.01)

(58) Field of Classification Search
CPC ............. H02K 1/17; H02K 1/148; H02K 3/04
See application file for complete search history.

(56) References Cited

U.S. PATENT DOCUMENTS

| | | | |
|---|---|---|---|
| 2016/0020652 A1* | 1/2016 | Hunstable | H02P 25/18 310/177 |
| 2016/0380496 A1* | 12/2016 | Hunstable | H02K 21/26 310/179 |
| 2017/0237325 A1* | 8/2017 | Hunstable | H02K 21/22 310/156.43 |

FOREIGN PATENT DOCUMENTS

WO   WO-2016164818 A1 * 10/2016 ............. H02K 1/145

* cited by examiner

*Primary Examiner* — Gary A Nash
(74) *Attorney, Agent, or Firm* — Run8 Patent Group, LLC; Peter Miller; Alexander Rodriguez

(57) ABSTRACT

A system includes: a set of magnetic elements arranged radially about a motor axis; and a set of coil modules. The set of coil modules includes: a first subset of coil modules defining a first independent phase configuration; and a second subset of coil modules defining a second independent phase configuration, different from the first independent phase configuration. The controller is configured to: drive a first current at a first magnitude through the first subset of coil modules to induce magnetic coupling between the first subset of coil modules and the set of magnetic elements; and drive a second current at the first magnitude through the second subset of coil modules to induce magnitude coupling between the second subset of coil modules and the set of magnetic elements, and maintain a target power output.

20 Claims, 10 Drawing Sheets

Related U.S. Application Data application No. PCT/US2020/013966, filed on Jan. 16, 2020.

(60) Provisional application No. 63/527,460, filed on Jul. 18, 2023, provisional application No. 62/804,102, filed on Feb. 11, 2019, provisional application No. 62/801,237, filed on Feb. 5, 2019, provisional application No. 62/793,359, filed on Jan. 16, 2019.

though these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

SYSTEM AND METHOD FOR AN OVERLAPPING INDEPENDENT PHASE ELECTRIC MOTOR/GENERATOR

CROSS-REFERENCE TO RELATED APPLICATIONS

This Application is a continuation-in-part of U.S. Non-Provisional application Ser. No. 18/610,171, filed on 19 Mar. 2024, which is a continuation of U.S. Non-Provisional application Ser. No. 17/375,863, filed on 14 Jul. 2021, which is a 371 Application of International Application No. PCT/US2020/013966, filed 16 Jan. 2020, which claims the benefit of U.S. Provisional Application No. 62/793,359, filed on 16 Jan. 2019, 62/801,237, filed on 5 Feb. 2019, and 62/804,102, filed on 11 Feb. 2019, each of which is hereby incorporated in its entirety by this reference.

This application claims the benefit of U.S. Non-Provisional application Ser. No. 63/527,460, filed on 18 Jul. 2023, which is hereby incorporated in its entirety by this reference.

This Application is related to U.S. Non-Provisional application Ser. No. 17/003,855, filed on 26 Aug. 2020, Ser. No. 17/003,905, filed on 26 Aug. 2020, Ser. No. 17/412,043, filed on 25 Aug. 2021, Ser. No. 17/562,369, filed on 27 Dec. 2021, Ser. No. 17/831,337, filed on 2 Jun. 2022, and Ser. No. 18/086,508, filed on 21 Dec. 2022, each of which is hereby incorporated in its entirety by this reference.

TECHNICAL FIELD

This invention relates generally to the field of electric motors (and/or electric generators) and more specifically to a new and useful system and method for an overlapping independent phase electric motor (and/or electric generator) in the field of electric motors (and/or electric generators).

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. System

Figure 1:
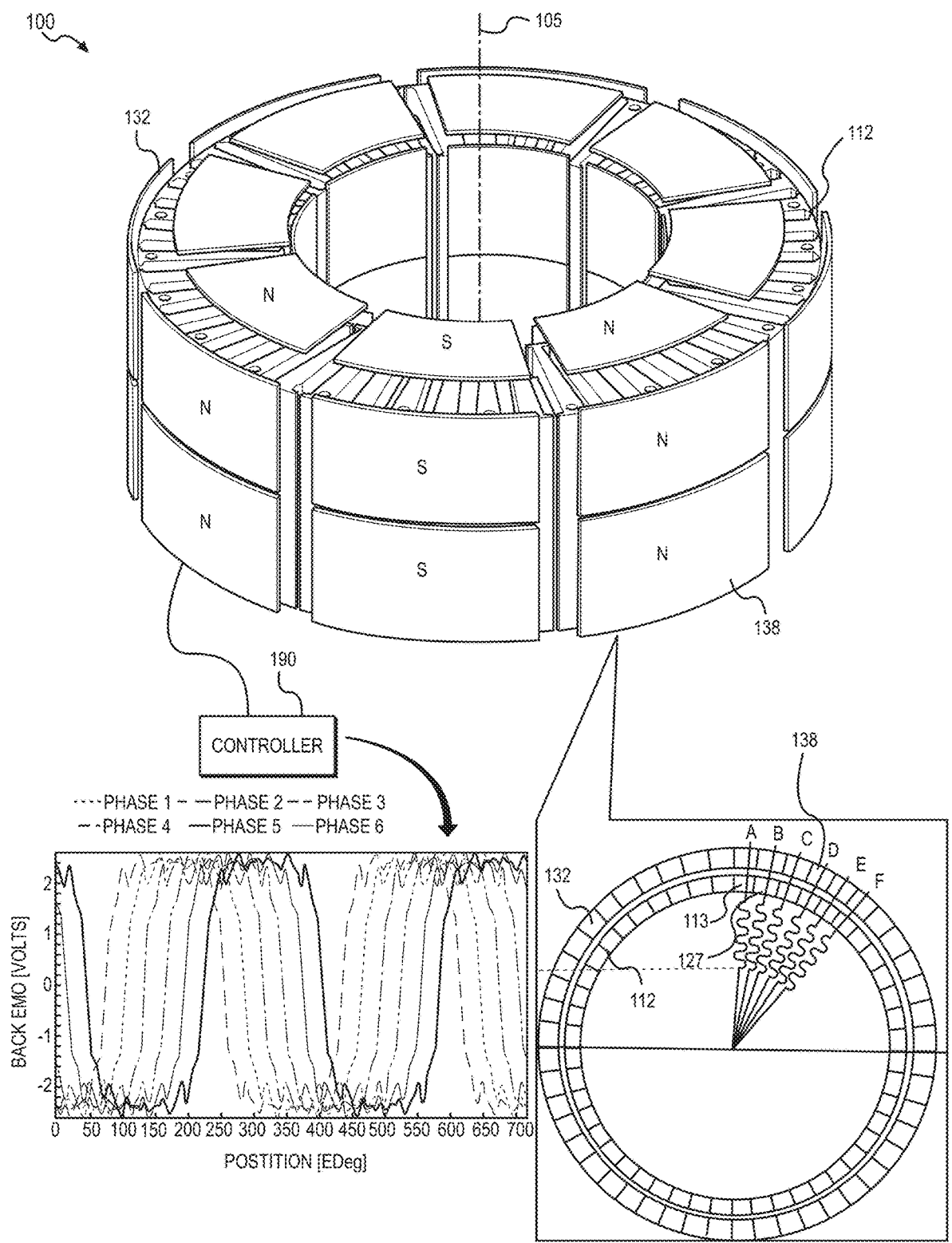
FIG. 1 is a schematic representation of a system.
Figure 2:
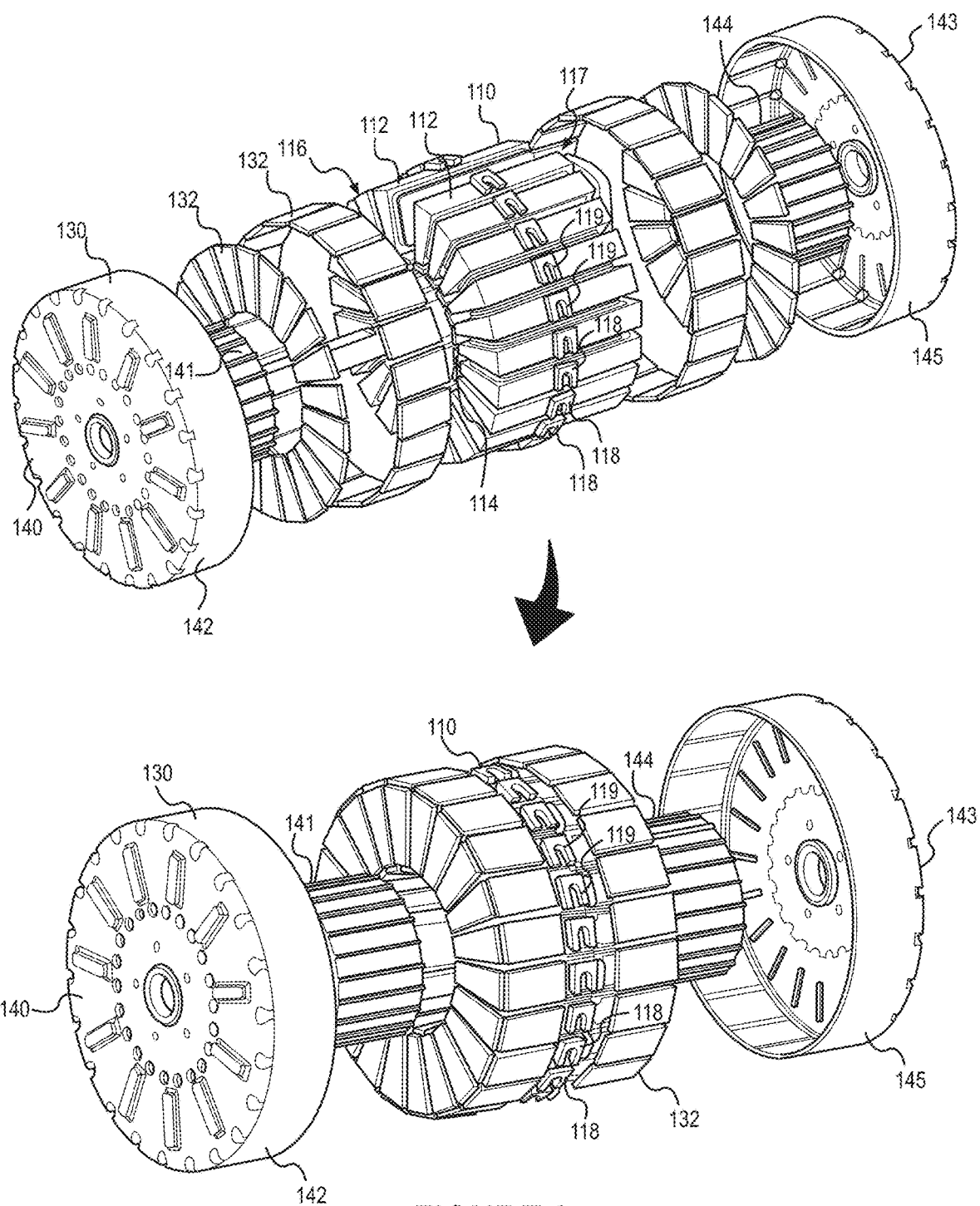
FIG. 2 is a schematic representation of the system.
Figure 3:
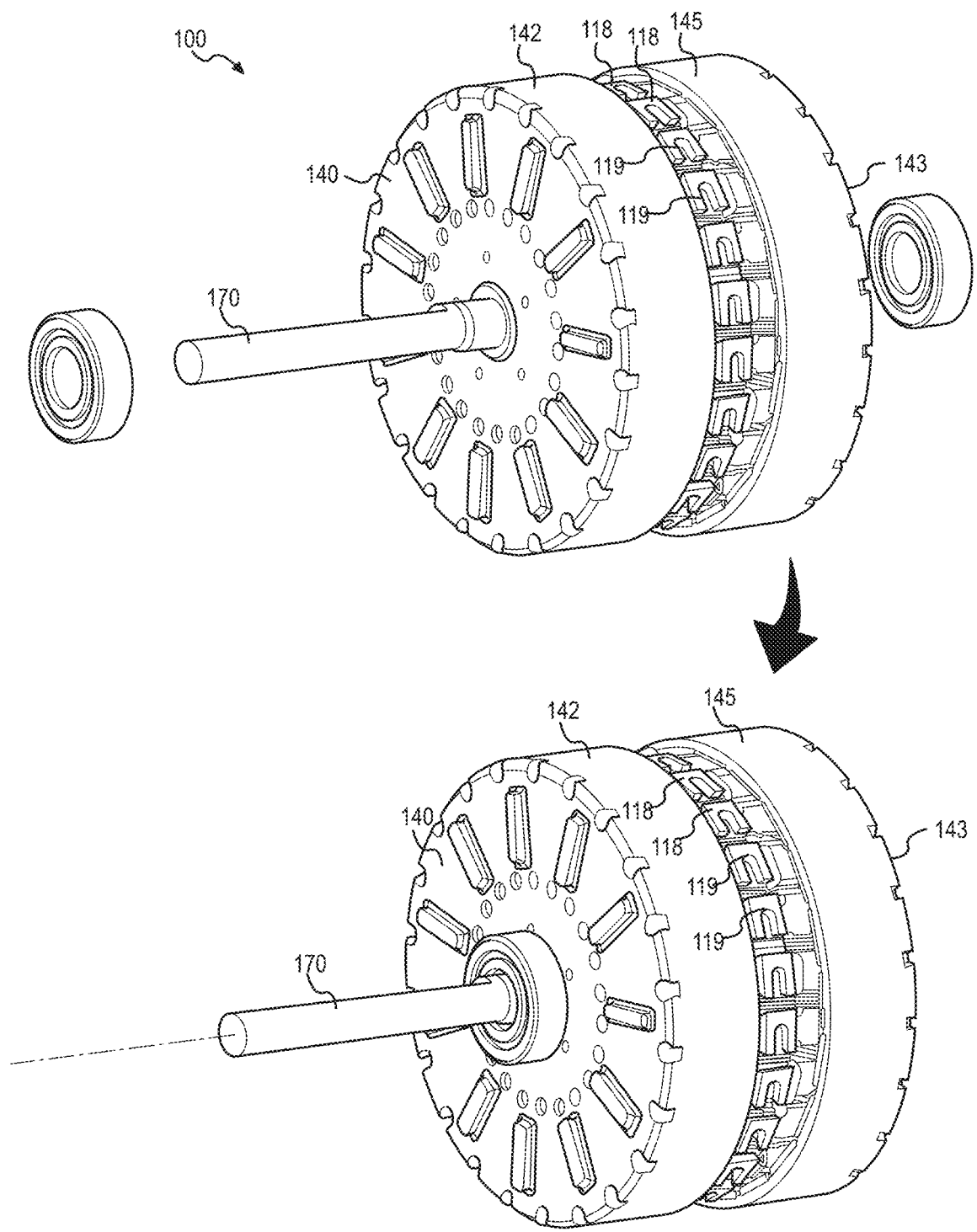
FIG. 3 is a schematic representation of the system.
Figure 4:
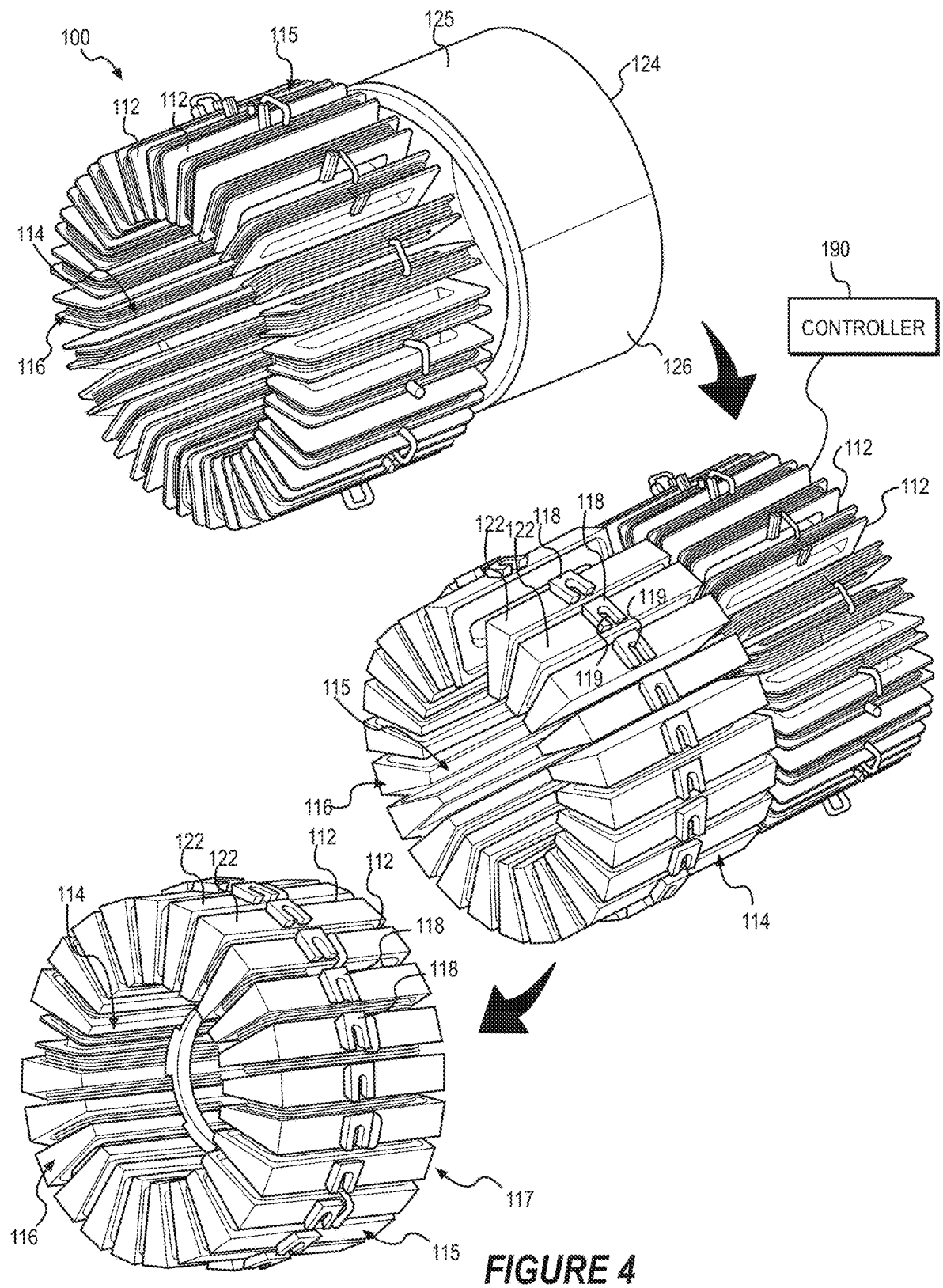
FIG. 4 is a schematic representation of the system.
Figure 5:
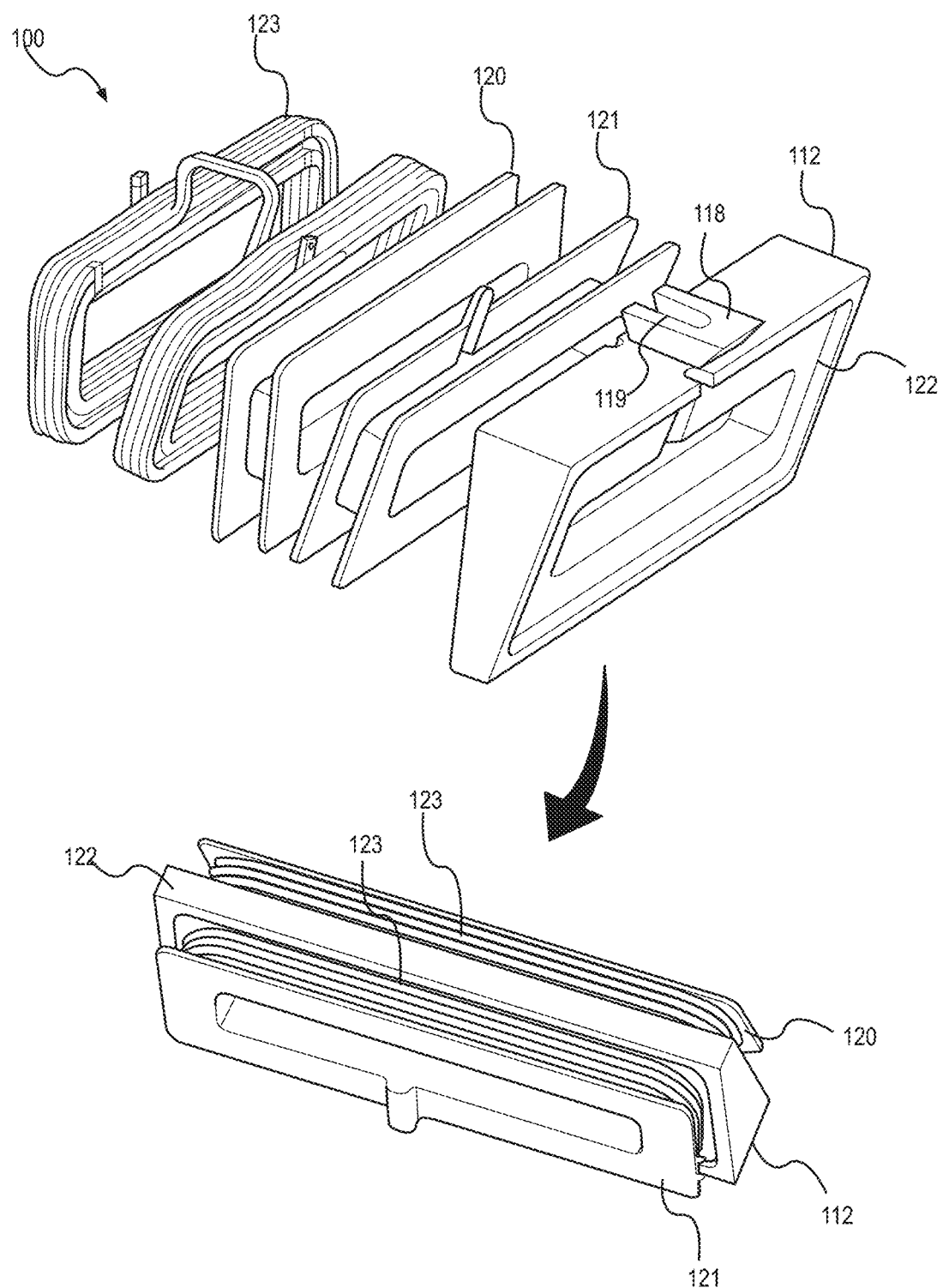
FIG. 5 is a schematic representation of the system.
Figure 6:
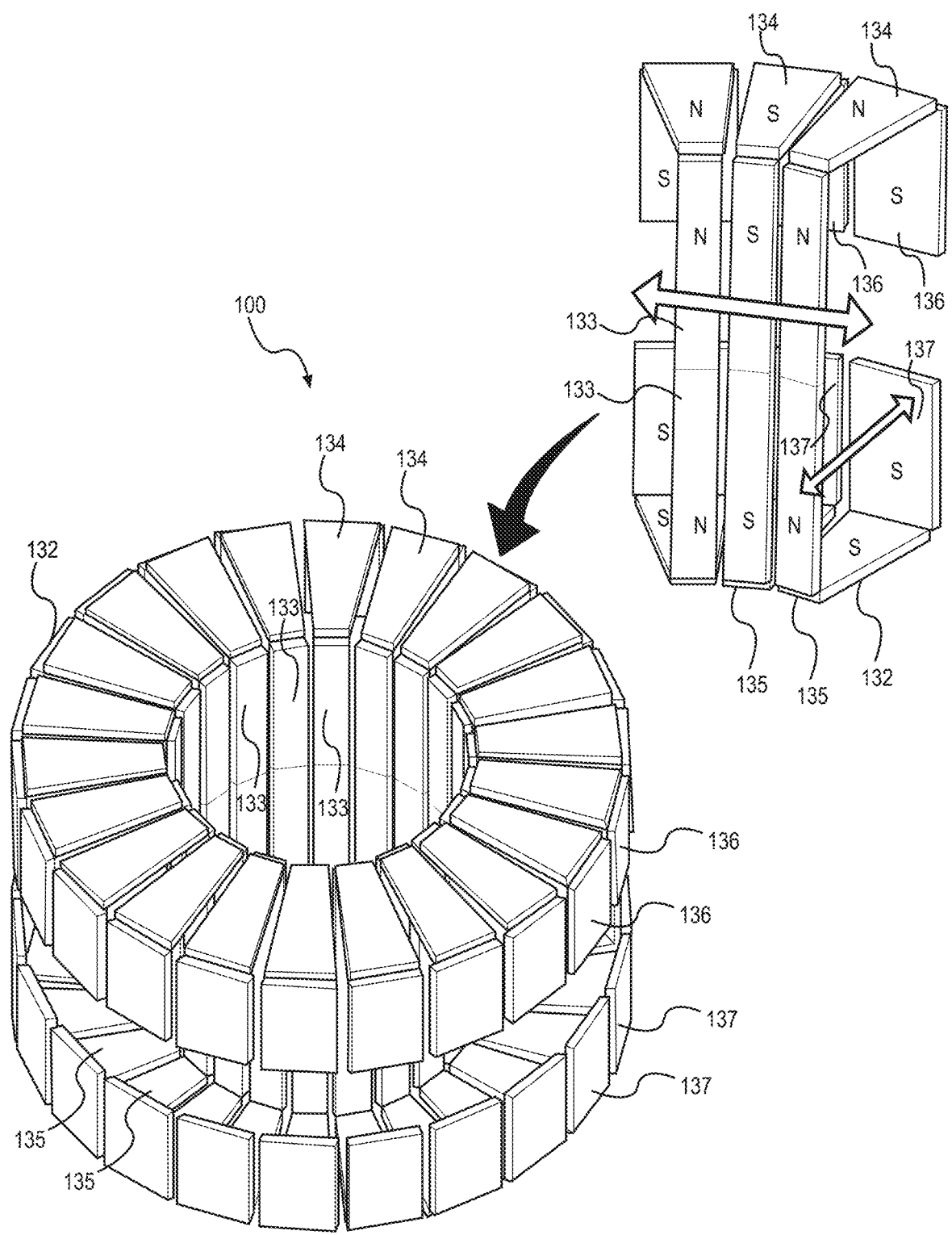
FIG. 6 is a schematic representation of the system.
Figure 7A:
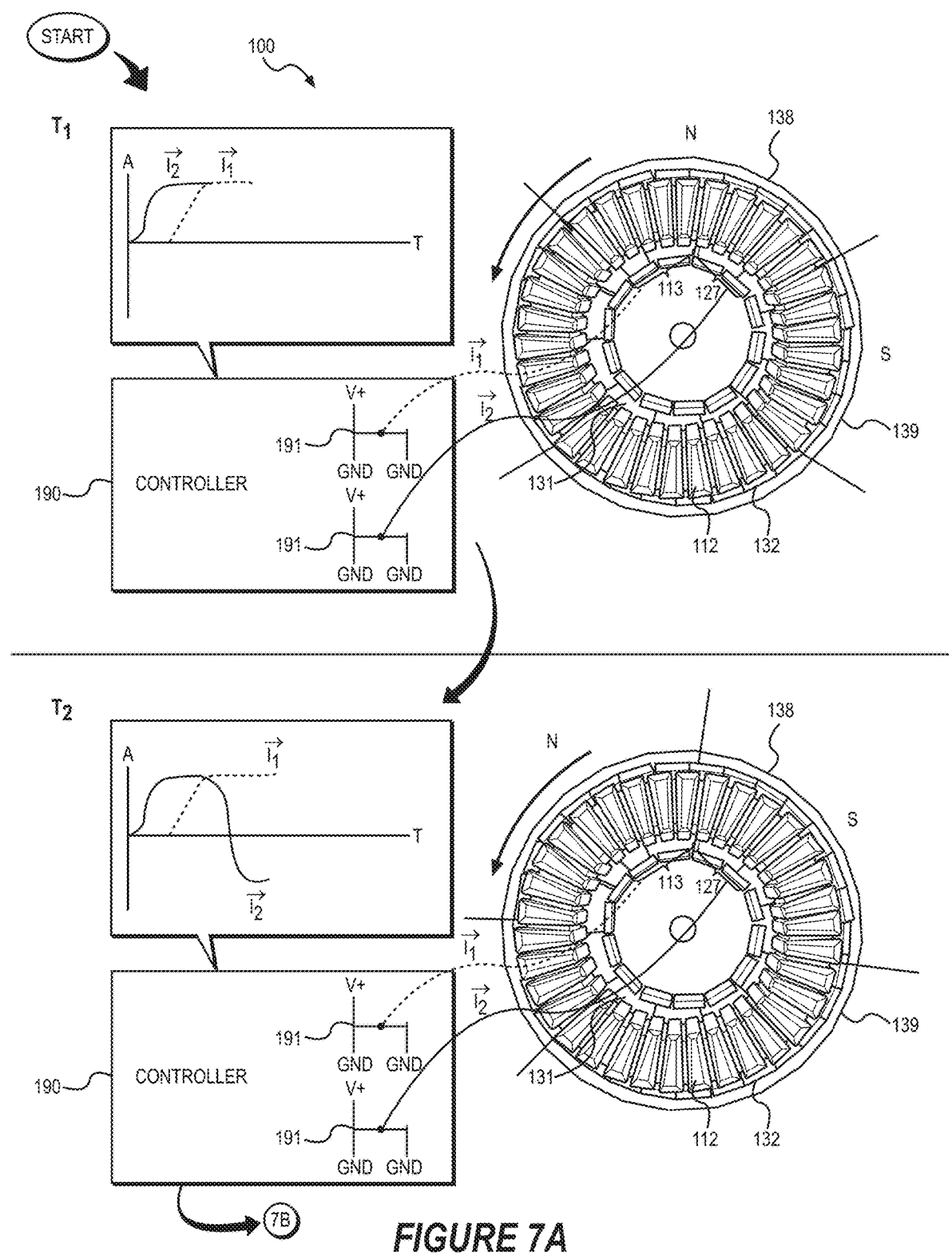
FIGS. 7A and 7B are schematic representations of the system.
Figure 7B:
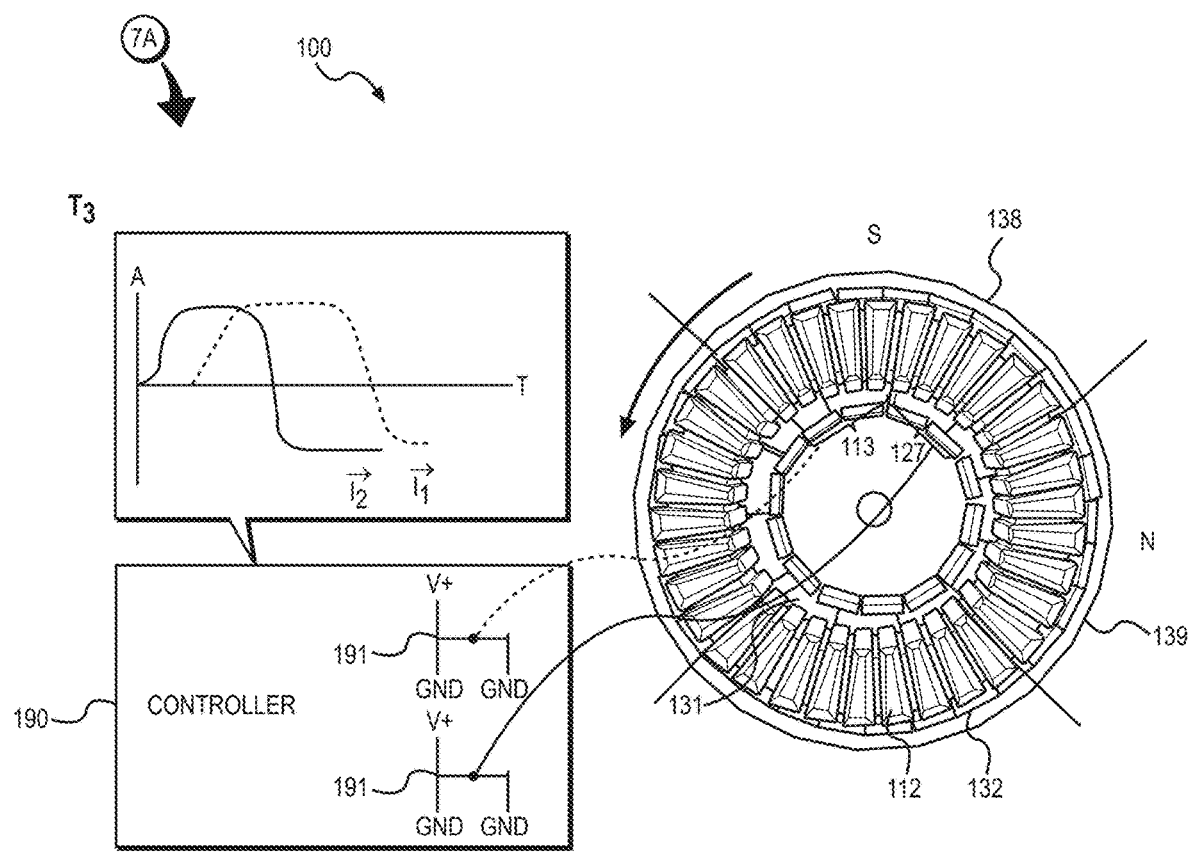
Figure 8:
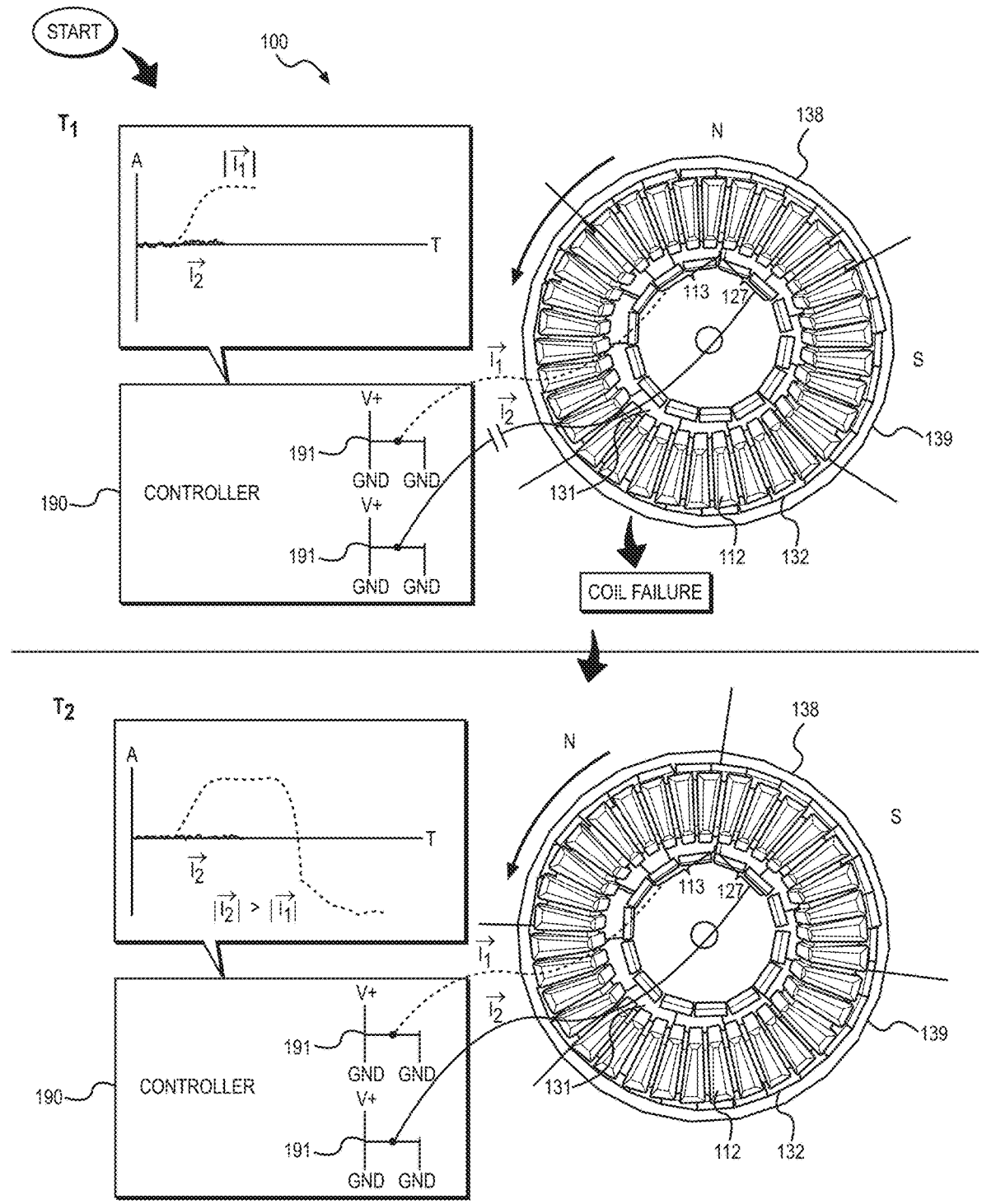
FIG. 8 is a schematic representation of the system.
Figure 9:
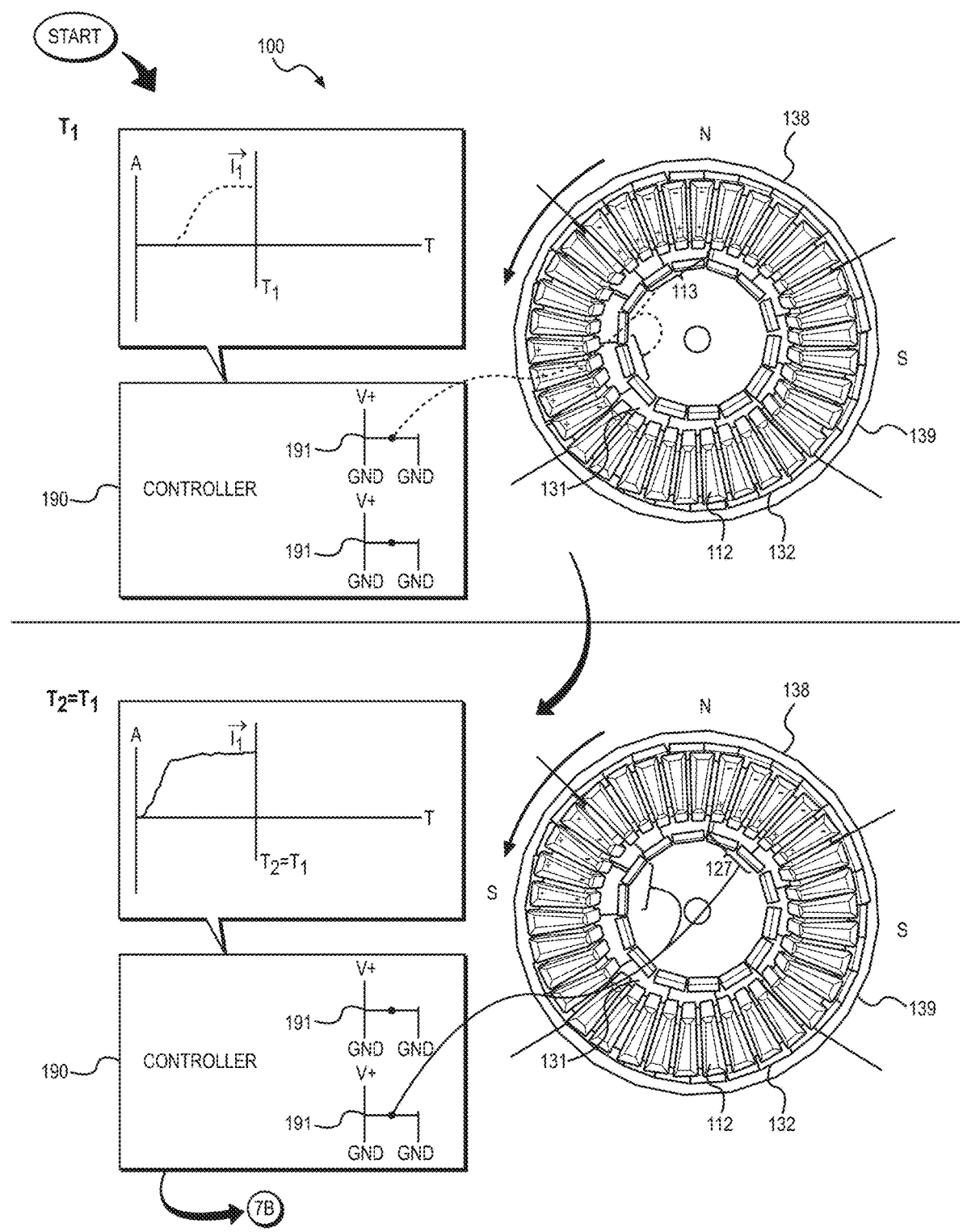
FIG. 9 is a schematic representation of the system.

As shown in FIG. 1, a system 100 for an electric motor/generator includes: a set of magnetic elements 132; a set of coil modules 112; and a controller 190.

The set of magnetic elements 132: is arranged about a motor axis 105; and forms a radial magnetic tunnel 131 including a first tunnel segment 138 defining a first magnetic polarity.

The set of coil modules 112 is arranged within the radial magnetic tunnel 131 and includes a first coil module 113 and a second coil module 127. The first coil module 113: is arranged within the first tunnel segment 138; and defines a first independent phase configuration. The second coil module 127: is arranged within the first tunnel segment 138 radially offset from the first coil module 113; defines a second independent phase configuration, different from the first independent phase configuration; and cooperates with the first coil module 113 to define a first polar region about the radial magnetic tunnel 131.

The controller 190 is configured to, during a first time period: drive a first current in a first direction through the first coil module 113 to induce magnetic coupling between the first coil module 113 and the first tunnel segment 138; and drive a second current in the first direction through the second coil module 127 to induce magnetic coupling between the second coil module 127 and the first tunnel segment 138. The second coil module 127 cooperates with the first coil module 113 to maintain a target power output.

1.1 Variation: Maintaining Target Power Output

In one variation of the system 100, the controller 190 is configured to, during the first time period: drive the first current at a first magnitude through the first coil module 113 to induce magnetic coupling between the first coil module 113 and the first tunnel segment 138; and drive the second current at a second magnitude, approximating the first magnitude, through the second coil module 127 to induce magnetic coupling between the second coil module 127 and the first tunnel segment 138. The second coil module 127 cooperates with the first coil module 113 to maintain the target power output.

Additionally, the controller 190 is configured to, during a second time period: read a set of electrical values from the second coil module 127; detect a ground short across the second coil module 127 based on the set of electrical values; in response to detecting the ground short, terminate driving of the second current through the second coil module 127; and drive a third current at a third magnitude, greater than the first magnitude, through the first coil module 113 to induce magnetic coupling between the first coil module 113 and the first tunnel segment 138 and maintain the target power output.

2. Applications

Generally, the system 100 can function as an electric motor (and/or electric generator) to: concurrently drive current across set of coil modules 112 arranged about a motor axis 105; and induce independent magnetic coupling between coil modules, in the set of coil modules 112, and a set of magnetic elements 132 forming a radial magnetic tunnel 131 encompassing the set of coil modules 112. In particular, the system 100 can: uniformly distribute a supply voltage (e.g., 6.0 Volts) across multiple (e.g., six) independent subsets of coil modules, in the set of coil modules 112; induce independent magnetic coupling between the subsets of coil modules and the radial magnetic tunnel 131; and generate rotation of the radial magnetic tunnel 131 about the set of coil modules 112 at a target torque output.

In particular, the system 100 can: concurrently drive current across the subsets of coil modules to induce magnetic coupling between a first group of independent phase coils and a first tunnel segment 138; and generate rotation of the first tunnel segment 138 about the first group of independent phase coils. Thus, rather than sequentially driving current across the set of coil modules 112 to induce sequential magnetic phase coupling within the radial magnetic tunnel 131, the system 100 can concurrently drive current across subsets of coil modules to induce concurrent magnetic phase coupling within the radial magnetic tunnel 131 to rotate the radial magnetic tunnel 131 about the set of coil modules 112. Therefore, the system 100 can achieve a target torque output by delivering a minimal supply voltage (e.g., six volts) across subsets of coil modules, in the set of coil modules 112, during operation of the electric motor (and/or electric generator).

For example, the system 100 can include: a first subset of coil modules arranged about the motor axis 105 and defining a first phase configuration; and a second subset of coil modules radially offset (e.g., by 7.5 degrees) from the first subset of coil modules about the motor axis 105 and defining a second phase configuration different from the first phase configuration. Accordingly, the first subset of coil modules and the second subset of coil modules can cooperate to form groups of independent-phase coil modules (e.g., eight groups of independent-phase coil modules) about the motor axis 105. The system 100 also includes the set of magnetic elements 132: arranged about the motor axis 105 to form tunnel segments encompassing the set of coil modules 112; and defining a pattern of pole configurations configured to induce flux distribution across axial and radial facets of the set of coil modules 112.

In this example, the system 100 includes: a four sided radial magnetic tunnel 131 (e.g., an outer runner design) including a first tunnel segment 138 exhibiting a first magnetic polarity (e.g., north polarity) encompassing a first grouping of coil modules in the set of coil modules 112; a first coil module 113, in the first grouping of coil modules, of the first phase configuration arranged within the first tunnel segment 138; and a second coil module 127, in the first grouping of coil modules, of the second phase configuration arranged within the first tunnel segment 138. The system 100 can then: over a first duration of time, drive current in a first direction across the first subset of coil modules to induce magnetic coupling between the first coil module 113 and the first tunnel segment 138; and, over a second duration of time concurrent with the first duration of time, drive current in the first direction across the second subset of coil modules, to induce magnetic coupling between the second coil module 127 and the first tunnel segment 138. Accordingly, during operation of the electric motor (and/or electric generator), the first coil module 113 and the second coil module 127 in the first grouping of coil modules, concurrently and magnetically rotates the first tunnel segment 138 to locate a second tunnel segment 139—of a second magnetic polarity opposite the first magnetic polarity—about the first grouping of coil modules. The system 100 can then: drive current across the first grouping of coil modules in a second direction, opposite the first direction, to induce magnetic coupling between the first grouping of coil modules and the second tunnel segment 139; and repeat this process to achieve a revolution of the radial magnetic tunnel 131 about the set of coil modules 112.

In this example, the system 100 can include: a set of magnetic poles (e.g., 48 poles) arranged into a set of coil groupings (e.g., eight groups of coils) each including a set of independent coils (e.g., 6 independent coils). In particular, each coil grouping, in the set of coils groupings, defines a first polar region—in a set of polar regions (e.g., eight polar regions)—about the electric motor. The system 100 can then include a controller 190 (e.g., Bridge circuit): connecting the set of coil groupings into six distinct phases; and configured to modify polarities between the set of magnetic poles and the radial magnetic tunnel 131 by driving current across the set of coil groupings to induce rotation of the electric motor. Accordingly, rather than requiring 48 polarity pulses for each coil to complete a revolution of a rotor 130—such as a in a traditional wye configuration electric generator/motor of 48 poles, the system 100 can complete a revolution of the rotor 130 with eight polarity pulses for each coil module thus, increasing operational lifespan of the system 100.

Therefore, the first coil module 113 in the first grouping of coil modules: concurrently and magnetically couples the first tunnel segment 138 independent from the second coil module 127, in the first grouping of coil modules; and cooperates with the second coil module 127 to induce rotation of the radial magnetic tunnel 131 about the set of coil modules 112 toward a target torque output. Accordingly, the system 100 can: induce independent magnetic coupling across subsets of coil modules (e.g., six subsets of coil modules); generate concurrent rotational forces at the subsets of coil modules and thereby rotate a rotor core-including the set of magnetic elements 132—about the set of coil modules 112.

It should be understood, although the aforementioned example describes a six-independent phase electric motor/generator, the system can implement any number (e.g., 2, 3, 4, 5, 6, n-number) of independent phases, such as based on design requirements and/or applications of the electric motor/generator.

2.1 Applications: Ground Short Response

Generally, the system 100 can maintain motor/generator operation at a target power output in the event of a coil module failure (e.g., ground short) without pausing operation of the motor/generator. More specifically, the system 100 can: detect a failure event across a coil module (or multiple coil modules) across the set of coil modules 112; identify a group of coil modules corresponding to a particular independent phase configuration containing the ground short; and, in response to detecting the failure event, 1) terminate driving of current through the group of coil modules and 2) adjust (e.g., increase) current across the operational coil modules (i.e., non-ground shorted coil modules) to maintain operation of the motor/generator at a target power output (e.g., 2.5 kilowatts) without pausing operation of the motor/generator.

In one example, the system 100 includes a set of coil modules 112 operating in a six independent phase configuration (i.e., six groups of coil modules each operating in an independent phase configuration). During an initial mode of operation, the system 100 can independently drive current through each of the groups of coil modules at a first magnitude (e.g., 100 amps) to maintain a target power output (e.g., 2.5 kilowatts) from the motor/generator. The system 100 can then: read a set of electrical values (e.g., back emf current values) across a coil module (or multiple coil modules) in the set of coil modules 112; detect a ground short failure across the coil module based on the set of electrical values; and identify a group of coil modules in the set of coil modules 112 containing the ground short failure and corresponding to a particular independent phase configuration. Accordingly, the system 100 can then: terminate driving of current through the group of coil modules corresponding to the particular independent phase configuration; and maintain driving of current through the remaining operational groups of coil modules (i.e., the remaining five groups of coil modules) without pausing operation of the motor generator.

Terminating driving of current through the group of coil modules results in a decreased power output (e.g., 2.2 kilowatts) from the target power output (e.g., 2.5 kilowatts). Thus, the system 100 can remain operational in response to the failure event across the group of coil modules. To compensate for this drop in power, the system 100 can then: independently drive current across each of the remaining operational groups of coil modules at a second magnitude (e.g., 120 amps) greater than the first magnitude (e.g., 100 amps) to maintain the target power output (e.g., 2.5 kilowatts) from the system 100.

Therefore, the system 100 can maintain a target power output following detection of a failure event across a coil module (or multiple coil modules) in the set of coil modules 112 without pausing operation of the system 100.

3. Stator

Generally, the system 100 includes a stator 110 including: set of coil modules 112 arranged in a radial pattern about a motor axis 105; and a stator yoke 124 supporting the set of coil modules 112 in the radial pattern about the motor axis 105. In particular, each coil module, in the set of coil modules 112 can include: a first bobbin 120 coupled to the stator yoke 124; a winding 123 wound about a winding 123 receiving slot of the first bobbin 120 and including a first set of leads; and a stator pole 122 arranged adjacent the first bobbin 120 at the stator pole 122 and formed of a ferrous material (e.g., steel, cast iron, wrought iron, aluminum, copper, lead, soft iron powder, etc.). Each coil module is then coupled to the stator yoke 124 to form a cylindrical stator ring about the motor axis 105 that defines: an inner radial facet 114; an outer radial facet 115; a first axial facet 116; and a second axial facet 117 opposite the first axial facet 116. The system 100 can further include a controller 190: connected to the first set of leads for each coil module, in the set of coil modules 112; and configured to sequentially drive current (e.g., AC current, DC current) through the set of coil modules 112 in order to sequentially generate a toroidal magnetic field that then couples the set of magnetic elements 132 of the rotor 130.

3.1 Coil Modules

In one implementation, the system 100 includes each coil module, in the set of coil modules 112 including: a first bobbin 120; a second bobbin 121, a stator pole 122; and a winding 123. In this implementation, the first bobbin 120, the second bobbin 121, the stator pole 122, and the winding 123 cooperate with each other to form a pole tunnel segment of the cylindrical stator ring. In particular, the first bobbin 120 can define: a first aperture (e.g., a circular opening); and a first winding receiving slot (e.g., a recessed channel) about an exterior of the first bobbin 120. The second bobbin 121: is arranged opposite the first bobbin 120; defines a second aperture (e.g., circular opening) in alignment with the first aperture of the first bobbin 120; and defines a second winding receiving slot (e.g., recessed channel) about an exterior of the second bobbin 121.

In the aforementioned implementation, the stator pole 122: is formed of a ferrous material (e.g., steel, cast iron, wrought iron, aluminum, copper, lead, soft magnetic iron powder, etc.); is interposed between the first bobbin 120 and the second bobbin 121; defines a third aperture (e.g., circular opening) in alignment with the first aperture of the first bobbin 120 and the second aperture of the second bobbin 121, which forms the pole tunnel segment for the cylindrical stator ring; and includes the receiving member 118 arranged at an outer radial side of the stator pole 122, which faces an inner wall of the housing when the cylindrical stator ring is contained within the housing. In one example, the receiving member 118: defines a protrusion (e.g., U-shaped protrusion, O-Shaped protrusion) extending from the outer radial side of the stator pole 122; and includes a threaded cavity 119 configured to receive a fastening element (e.g., bolt, threaded fastener). Furthermore, the winding 123: is coiled about the first winding receiving slot of the first bobbin 120 and the second winding receiving slot of the second bobbin 121; and includes a first set of leads that are then coupled to the controller 190.

The system 100 can then replicate this structure for each coil module, in the set of coil modules 112, and mount the set of coil modules 112 to the stator yoke 124 to then form the cylindrical stator ring. The controller 190 is then connected to the first set of leads of each coil module, in the set of coil modules 112, which then enables for the system 100 to selectively drive current through the set of coil modules 112.

In one example, the system 100 can include twenty-one coil modules, each mounted to the stator yoke 124, to define the cylindrical stator ring. In this example, each of the coil modules, in the twenty-one coil modules, includes a set of leads that are coupled to the controller 190. The controller 190 can then sequentially drive current through each coil module, in the set of coil modules 112, to then generate a toroidal magnetic field that couples the set of magnetic elements 132 of the rotor 130, thereby enabling rotation of the rotor 130 enveloping the set of coil modules 112.

Therefore, the system 100 can include a set of coil modules 112 that define a cylindrical stator ring configured to generate a toroidal magnetic field that couples the set of magnetic elements 132 arranged at each facet (e.g., radial facets and axial facets) of the cylindrical stator ring, thereby enabling rotation of the rotor 130.

3.2 Stator Yoke

In one implementation, the system 100 includes the set of coil modules 112 mounted to a stator yoke 124 to define the cylindrical stator ring. In this implementation, the stator yoke 124: defines a cylindrical body about the motor axis 105; and receives each coil module, in the set of coil modules 112, via the pole tunnel segment. Each coil module, in the set of coil modules 112, is then mounted to the stator yoke 124 to form the cylindrical stator ring.

In one example, the stator yoke 124 includes: a first yoke segment 125; and a second yoke segment 126. In this example, the first yoke segment 125: defines a first semi-circular arc; and extends radially about the motor axis 105. Additionally, the second yoke segment 126: defines a second semi-circular arc; extends radially about the motor axis 105; is coupled to a first end and a second end of the first yoke segment 125; and cooperates with the first yoke segment 125 to define a cylindrical stator yoke 124. In this example, the set of coil modules 112 includes: a first subset of coil modules defining a first tunnel segment 138 configured to receive the first yoke segment 125; and a second subset of coil modules defining a second tunnel segment 139 and configured to receive the second yoke segment 126.

In the aforementioned example, the first subset of coil modules can be assembled onto the first yoke segment 125 and the second subset of coil modules can be assembled onto the second yoke segment 126 independently from one another. Subsequently, the assembled first stator yoke 124 can be coupled to the first end and the second end of the assembled second stator yoke 124, such as by welding, pressure sensitive adhesives, and/or fastening, thereby forming the cylindrical stator ring.

Therefore, the system 100 can include a stator yoke 124 to support and maintain the set of coil modules 112 in a circular configuration, thereby enabling the formation of a toroidal magnetic field responsive to driving current through the set of coil modules 112 during operation of the system 100.

4. Rotor

Generally, the system 100 includes a rotor 130 including a set of magnetic elements 132: encompassing the set of coil modules 112; defining a radial magnetic tunnel 131 about the motor axis 105; and configured to generate a flux density distribution focused toward the set of coil modules 112. In particular, the set of magnetic elements 132 are arranged across the inner radial facet 114, the outer radial facet 115, the first axial facet 116, and the second axial facet 117 of the set of coil modules 112, thereby enveloping the set of coil modules 112 to form the radial magnetic tunnel 131. Thus, when the system 100 drives current through the set of coil modules 112, the stator poles 122 of the set of coil modules 112 magnetically couple the set of magnetic elements 132 at each facet of the cylindrical stator ring, thereby rotating the rotor 130.

4.1 Magnetic Flux Tunnel

In one implementation, the system 100 includes the set of magnetic elements 132: encompassing the inner radial facet 114, the outer radial facet 115, the first axial facet 116, and the second axial facet 117 of the cylindrical stator ring; and defining a radial slot about the outer radial facet 115 of the cylindrical stator ring exposing the receiving member 118 of each coil module, in the set of coil modules 112. In this implementation, the set of magnetic elements 132 can form a C-shape configuration that partially extends across the outer radial facet 115 of the cylindrical stator ring to define the radial slot. Thus, when the set of coil modules 112 and the set of magnetic elements 132 are contained within the housing, the receiving member 118s of each coil module face the inner wall of the housing.

In one example, the system 100 includes a set of magnetic elements 132 including: a subset of inner radial magnetic elements arranged in a radial pattern about the inner radial facet 114 of the set of coil modules 112; a first subset of axial magnetic elements 134 arranged in a radial pattern about the first axial facet 116 of the set of coil modules 112; and a second subset of axial magnetic elements 135 arranged in a radial pattern about the second axial facet 117 of the set of coil modules 112. Additionally, the set of magnetic elements 132 can include a first subset of outer radial magnetic elements 136: arranged normal the first subset of axial magnetic elements 134; and extending partially across the outer radial facet 115 of the set of coil modules 112. Furthermore, the set of magnetic elements 132 includes a second subset of outer radial magnetic elements 137: arranged normal the second subset of axial magnetic elements 135; extending partially across the outer radial facet 115 of the set of coil modules 112; and cooperating with the first subset of outer radial magnetic elements 136 to define a radial slot exposing the receiving member 118 of each coil module, in the set of coil modules 112, arranged about outer radial facet 115.

Therefore, the system 100 includes a set of magnetic elements 132 encompassing the facets of the cylindrical stator ring and defining a radial slot exposing the receiving member 118 of each coil module, in the set of coil modules 112, in order to: enable magnetic flux linkage about each facet of the set of coil modules 112 during operation of the electric motor; and enable the housing to rigidly couple the set of coil modules 112 at the receiving member 118 of the coil module.

4.2 Halbach Configuration

In one implementation, as described in U.S. application Ser. No. 17/979,615, the system 100 can include a set of magnetic elements 132: arranged in a Halbach array configuration about the inner radial facet 114, the outer radial facet 115, the first axial facet 116, and the second axial facet 117 of the set of coil modules 112; and configured to generate a flux density distribution directed toward the set of coil modules 112.

In one example, the system 100 includes a set of inner radial magnetic elements: arranged in a first Halbach array configuration about the inner radial facet 114 of the stator; and defining a first flux density distribution focused toward the inner radial facet 114. Additionally, the system 100 includes a set of outer radial magnetic elements: arranged in a second Halbach array configuration, in alignment with the first Halbach array configuration, about the outer radial facet 115 of the stator 110; and defining a second flux density distribution focused toward the outer radial facet 115.

In the aforementioned example, the system 100 further includes a first set of axial magnetic elements: arranged in a third Halbach array configuration about the first axial facet 116 of the stator 110; and defining a third flux density distribution focused toward the first axial facet 116. Furthermore, the system 100 includes a second set of axial magnetic elements: arranged in a fourth Halbach array configuration, in alignment with the third Halbach array configuration, about the second axial facet 117 of the stator 110; defining a fourth flux density distribution focused toward the second axial facet 117; and cooperating with the set of inner radial magnetic elements, the set of outer radial magnetic elements, and the first set of axial magnetic elements to form a magnetic flux tunnel enveloping the set of coil modules 112.

Therefore, the system 100 can include a set of magnetic elements 132 configured to direct a flux density distribution at each facet of the cylindrical stator ring, thereby increasing strength of the magnetic coupling between the stator poles 122 of the set of coil modules 112 and the set of magnetic elements 132 of the rotor 130.

4.3 Unitary Rotor Core

In one implementation, the system 100 includes a rotor core: encompassing the set of coil modules 112; and supporting the set of magnetic elements 132 to face the inner radial facet 114, the outer radial facet 115, the first axial facet 116, and the second axial facet 117. In this implementation, the rotor core includes a set of receiving slots configured to receive the set of magnetic elements 132, and locates the set of magnetic elements 132 to face the set of coil modules 112 to define the radial magnetic tunnel 131. In this implementation, the rotor core can define a C-shaped structure that: encompasses the set of coil modules 112; and defines the radial slot to expose the receiving member 118 of each coil module.

For example, the system 100 can include the rotor 130 including an inner rotor core: arranged within an inner radius of the set of coil modules 112; defining a set of inner slots arranged about the inner rotor core; and including a subset of inner radial magnetic elements, in the set of magnetic elements 132, arranged at the set of inner slots and facing the inner radial facet 114 of the set of coil modules 112. Additionally, the rotor 130 includes an outer rotor core including: a first outer plate, a second outer plate, and an outer radial wall. The first outer plate: is coupled to the inner rotor core; defines a first set of outer slots; and includes a first subset of axial magnetic elements 134, in the set of magnetic elements 132, arranged at the first set of outer slots and facing the first axial facet 116 of the set of coil modules

112. Additionally, the second outer plate: is arranged opposite the first outer plate; defines a second set of outer slots; and includes a second subset of axial magnetic elements 135, in the set of magnetic elements 132, arranged at the second set of outer slots and facing the second axial facet 117 of the set of coil modules 112. Furthermore, the outer radial wall: is interposed between the first outer plate and the second outer plate; defines a set of outer slots arranged about the outer radial wall; and includes a subset of outer radial magnetic elements, in the set of magnetic elements 132, arranged at the set of outer slots and facing the outer radial facet 115 of the set of coil modules 112.

In the aforementioned example, the shaft 170 is rigidly coupled to the inner rotor core and set in alignment with the motor axis 105. Thus, the system 100 can drive current through the set of coil modules 112 to generate a toroidal magnetic field that magnetically couples the set of magnetic elements 132 facing each facet of the set of coil modules 112, thereby rotating the rotor 130.

4.4 Dual Rotor Core

In one implementation, the system 100 includes an upper rotor core: spanning the first axial facet 116 of the set of coil modules 112; and partially extending across the inner radial facet 114 and the outer radial facet 115 of the set of coil modules 112. Additionally, the system 100 includes a lower rotor core: arranged opposite the upper rotor core; spanning the second axial facet 117 of the set of coil modules 112; and partially extending across the inner radial facet 114 and the outer radial facet 115 of the set of coil modules 112. In this implementation, the upper rotor core and the lower rotor core cooperate to define the radial slot exposing the receiving member 118 of each coil module. Furthermore, the upper rotor core and the second rotor core are coupled to each other such that when the system 100 drives current through the set of coil modules 112, the upper rotor core and the lower rotor core simultaneously rotate about the motor axis 105.

In one example, the system 100 includes a rotor 130 including a first radial plate 140: encompassing the first axial facet 116 of the set of coil modules 112; and including a first subset of axial magnetic elements 134, in the set of magnetic elements 132, arranged in a radial pattern facing a first axial facet 116 of the set of coil modules 112. Additionally, the rotor 130 includes a first inner rotor core 141: arranged within an inner radius of the set of coil modules 112; extending a first length less than a length of the inner radial facet 114 of the set of coil modules 112; centrally coupled to the first radial plate 140; and including a first subset of inner radial magnetic elements, in the set of magnetic elements 132, arranged in a radial pattern facing the inner radial facet 114 of the set of coil modules 112. Furthermore, the rotor 130 includes a first outer radial wall 142: extending about an outer radius of the first radial plate 140; partially encompassing the outer radial facet 115 of the set of coil modules 112; and including a first subset of outer radial magnetic elements 136, in the set of magnetic elements 132, arranged in a radial pattern facing the first axial facet 116 of the set of coil modules 112. In this example, the shaft 170 of the housing: extends outwardly from the first radial plate 140 coaxial with the motor axis 105; and is rigidly coupled to the first inner rotor core 141.

In the aforementioned example, the rotor 130 further includes a second radial plate 143: arranged opposite the first radial plate 140; encompassing the second axial facet 117 of the set of coil modules 112; and including a second subset of axial magnetic elements 135, in the set of magnetic elements 132, arranged in a radial pattern facing a second axial facet 117 of the set of coil modules 112. Additionally, the rotor 130 includes a second inner rotor core 144: arranged opposite the first inner rotor core 141 within the inner radius of the set of coil modules 112; extending a second length, matching the first length of the first inner rotor core 141, and less than the length of the inner radial facet 114 of the set of coil modules 112; centrally coupled to the second radial plate 143; and including a second subset of inner radial magnetic elements, in the set of magnetic elements 132, arranged in a radial pattern facing the inner radial facet 114 of the set of coil modules 112. Furthermore, the rotor 130 includes a second outer radial wall 145: extending about an outer radius of the second radial plate 143; partially encompassing the outer radial facet 115 of the set of coil modules 112; including a second subset of outer radial magnetic elements 137, in the set of magnetic elements 132, arranged in a radial pattern facing the second axial facet 117 of the set of coil modules 112; and cooperating with the first outer radial wall 142 to define a radial slot exposing the receiving member 118 of each coil module, in the set of coil modules 112, arranged about the outer radial facet 115. In this example, the shaft 170 of the housing is also coupled to the second inner rotor core 144.

Therefore, the system 100 can include an upper rotor core and a lower rotor core that: envelops the set of coil modules 112; supports the set of magnetic elements 132 to face the set of coil modules 112; and defines a radial slot about the outer radial facet 115 of the set of coil modules 112 to expose the receiving member 118 of each coil module, thereby enabling the housing to directly couple the receiving member 118 of the coil module when containing the set of coil modules 112 and the set of magnetic elements 132.

5. Overlapping Independent Phase Operation

Generally, the system 100 can include: set of coil modules 112 arranged to form groupings (e.g., eight groups) of independent phase coil module configurations (e.g., 6 coil modules); and drive current through the set of coil modules 112 to induce independent and concurrent coupling between the set of coil modules 112 and the set of magnetic elements 132. In particular, the system 100 can: drive current in a first direction across a first subset of coil modules, in the set of coil modules 112, to induce magnetic coupling between the first subset of coil modules and a first tunnel segment 138 in the radial magnetic tunnel 131; and concurrently drive current in the first direction across a second subset of coil modules, in the set of coil modules 112, to induce magnetic coupling between the second subset of coil modules and the first tunnel segment 138 in the radial magnetic tunnel 131. Thus, the system 100 can: generate independent rotation of the first subset of coil modules and the second subset coil modules within the radial magnetic tunnel 131; and uniformly distribute a supply voltage across subsets of coil modules, in the set of coil modules 112 to achieve a target torque output from the electric motor (and/or electric generator). Accordingly, a continuous and maximal torque output is produced as every phase is continuously contributing torque independently of any other phases status.

5.1 Tunnel Segment

In one implementation, the system 100 includes a set of magnetic elements 132: forming a radial magnetic tunnel 131 enveloping the set of coil modules 112; and defining a set of tunnel segments (e.g., cylindrical segments) that define an alternating magnetic polarity (e.g., NSNS) about the radial magnetic tunnel 131. In this implementation, the set of magnetic elements 132 includes a first tunnel segment 138 including: an inner radial magnetic wall of a first polarity (e.g., north polarity) encompassing the inner radial facet 114 of a first segment of the set of coil modules 112; and an outer radial magnetic wall of the first polarity (e.g., north polarity) arranged opposite the inner radial magnetic wall and encompassing the outer radial facet 115 of the first segment of the set of coil modules 112. Additionally, the first tunnel segment 138 includes: a first axial magnetic wall of the first polarity (e.g., north polarity) interposed between the inner radial magnetic wall and the outer radial magnetic wall and encompassing the first axial facet 116 of the first segment of the set of coil modules 112; and a second axial magnetic wall of the first polarity (e.g., north polarity) arranged opposite the first axial magnetic wall and encompassing the second axial facet 117 of the first segment of the set of coil modules 112. Thus, the inner radial magnetic wall, the outer radial magnetic wall, the first axial magnetic wall, and the second axial magnetic wall cooperate to: form a first tunnel segment 138 (e.g., cylindrical segment) enveloping a subset of coil modules, in the set of coil modules 112; and define a first magnetic polarity enveloping the subset of coil modules.

Accordingly, the set of magnetic elements 132 can further include a second tunnel segment 139: arranged adjacent the first tunnel segment 138; and defining a second polarity (e.g., south polarity), opposite the first polarity (e.g., north polarity) of the first tunnel segment 138, enveloping a second segment of the set of coil modules 112. Therefore, the system 100 can repeat this pattern to form a set of tunnel segments (e.g., eight tunnel segments): forming cylindrical tunnel segments arranged about the motor axis 105 to form the radial magnetic tunnel 131 containing the set of coil modules 112; and defining an alternating polarity pattern (e.g., NSNS polarity) arranged about the motor axis 105 and configured to concurrently couple the set of coil modules 112 within the radial magnetic tunnel 131.

5.2 Six-Phase Coil Module Arrangement

In one implementation, the system 100: includes the set of magnetic elements 132 forming a first tunnel segment 138 enveloping a first subset of coil modules (e.g., six coil modules), in the set of coil modules 112; and is configured to concurrently and magnetically couple each coil module, in the first subset of coil modules, to induce rotation of the set of magnetic elements 132—and therefore the shaft 170—about the motor axis 105. In this implementation, each coil module, in the first subset of coil modules: defines an independent phase configuration (e.g., 7.5 degrees) coupled to the controller 190 (e.g., drive controller); and is configured to concurrently couple a corresponding tunnel segment by simultaneously driving current through each coil module to induce rotation of the set of magnetic elements 132.

In one example, the system 100: includes set of coil modules 112 (e.g., 48 coil modules) arranged in a six-phase configuration (e.g., eight groups of six coils) contained within the set of magnetic elements 132; and includes the first tunnel segment 138 enveloping a first subset of coil modules (e.g., six coil modules) each of which are defined by an independent phase configuration coupled to the controller 190 (e.g., six Bridge circuit controller 190). In this example, the first subset of coil modules includes: a first coil module 113 of a first particular phase configuration arranged within the first tunnel segment 138; a second coil module 127 of a second particular phase configuration, different from the first particular phase configuration, arranged adjacent the first coil module 113 within the first tunnel segment 138; and a third coil module of a third particular phase configuration, different from the second and first particular phase configurations, arranged adjacent the second coil module 127 within the first tunnel segment 138. The first subset of coil modules also includes: a fourth coil module of a fourth particular phase configuration, different from the third, second, and first particular phase configurations, arranged adjacent the third coil module within the first tunnel segment 138; a fifth coil module of a fifth particular phase configuration, different from the fourth, third, second, and first particular phase configurations, arranged adjacent the fourth coil module within the first tunnel segment 138; and a sixth coil module of a sixth particular phase configuration, different form the fifth, fourth, third, second, and first particular phase configurations, arranged adjacent the fifth coil module within the first tunnel segment 138.

The system 100 can then repeat this process according to the phase offset or drive pattern to form a group (e.g., eight groups) of tunnel segments each encompassing a subset of independent phase coil modules (e.g., six independent coils), in the set of coil modules 112. Therefore, the system 100 can: concurrently drive current (i.e., except during polarity switching) across each coil module in the subset of independent phase coil modules; and concurrently and magnetically couple (i.e., except during polarity switching) the first tunnel segment 138 while lowering supply voltage required to induce rotation of the set of magnetic elements 132.

5.3 Overlapping Independent Phase

Generally, the system 100 includes: a set of magnets elements arranged to form a radial magnetic tunnel 131 defined by a set of tunnel segments (e.g., cylindrical tunnel segments) of alternating magnetic polarity; and set of coil modules 112 arranged within the radial magnetic tunnel 131 including subsets of coil modules formed of grouped independent phase coil modules, such as in 1, 2, or n-quantity of phase configurations. In particular, during operation the system 100 concurrently and independently drives current (i.e., except during current polarity switch) in a first direction across each subset of coil modules in the set of coil modules 112 to: concurrently magnetically couple each subset of coil modules, in the set of coil modules 112, to the set of tunnel segments; and induce rotation of the set of elements—and therefore the shaft 170—about the set of magnetic elements 132. Thus, the system 100 can reduce supply voltage to the electric motor (and/or electric generator) by distributing the supply voltage across the subsets of coil modules (e.g., 5 kilowatts per subset of coil modules) while maintaining a target output torque and speed during operation of the electric motor (and/or electric generator).

5.3.1 Independent Phase Coil+Tunnel Segment Coupling

In one implementation, the system 100 can include a set of coil modules 112: radially arranged about a motor axis 105; and defining a set of polar regions configured to magnetically couple a set of tunnel segments of the radial magnetic tunnel 131. In this implementation, a polar region—in the set of polar regions—can include a primary coil module 113: arranged within a tunnel segment in the set of tunnel segments; and defining a primary independent phase configuration. The polar region can further include a secondary coil module 127: arranged adjacent the primary coil module 113 within the tunnel segment; and defining a secondary independent phase configuration different from the first independent phase configuration.

The system 100 can then repeat this structure (e.g., n number of coil modules) across the polar region to populate the polar region with a first group of coil modules configured to magnetically couple the tunnel segment. For example, the polar region can include a group of six coil modules with each coil module corresponding to a particular independent phase configuration (e.g., 7.5 degrees) configured to couple the tunnel segment (e.g., 45-degree tunnel segment) of the radial magnetic tunnel 131. In this example, the group of six coil modules operate in six independent phase configurations. Additionally, the system 100 can then repeat the structure of the group of coil modules in the polar region across multiple (e.g., n-number of polar regions) about the set of coil modules 112. For example, the system 100 can: include a set of coil modules 112 defining eight polar regions; and include a group of six coil modules—with each coil module corresponding to a particular independent phase configuration—for each of the polar regions, in the set of eight polar regions, for a total of 48 coil modules. In this example, the magnetic tunnel can include eight tunnel segments configured to magnetically couple the set of eight polar regions in the set of coil modules 112.

In this implementation, the system 100 can then: independently drive (e.g., via a primary bridge circuit) a first current (e.g., 100 amps) through the primary coil module 113 to induce magnetic coupling between the primary coil module 113 and the tunnel segment; and independently drive (e.g., via a secondary bridge circuit) a second current (e.g., 100 amps) through the secondary coil module 127 to induce magnetic coupling between the secondary coil module 127 and the tunnel segment. Accordingly, the system 100 can independently drive a current through each coil module (e.g., n-coil modules) in a polar region of the set of coil modules 112 to induce concurrent magnetic coupling between each coil module in the polar region and the corresponding tunnel segment.

Therefore, each coil module (e.g., a single coil module) in a group of coil modules within a polar region can operate in a particular independent phase configuration in order to concurrently couple a tunnel segment of the radial magnetic tunnel 131.

5.3.2 Coil Module Groupings

In one implementation, a polar region—in the set of polar regions—can include a primary set of coil modules (e.g., 2, 3, 4 n-coil modules): arranged within a tunnel segment of the radial magnetic tunnel 131; and defining a primary independent phase configuration. Additionally, the polar region can include: a secondary set of coil modules (e.g., 2, 3, 4, n-coil modules): arranged adjacent the primary set of coil modules within the tunnel segment; and defining a secondary independent phase configuration different from the first independent phase configuration. In this implementation, rather than a single coil module in the polar region corresponding to a single independent phase configuration, the system 100 can include multiple (e.g., 2, 3, 4, n) coil modules in the polar region corresponding to a single independent phase configuration.

The system 100 can then repeat this structure (e.g., n number of coil modules for each independent phase configuration) across the polar region to populate the polar region with a first group of coil modules configured to magnetically couple the tunnel segment. For example, the polar region can include: a primary set of three coil modules corresponding to a primary independent phase configuration (e.g., 22.5 degrees); and a secondary set of three coil modules, adjacent the primary set of three coil modules, corresponding to a secondary independent phase configuration. The primary set of three coil modules cooperates with the secondary set of three coil modules to form a group of coil modules in the polar region configured to magnetically couple a corresponding tunnel segment (e.g., 45-degree segment) of the radial magnetic tunnel 131. In this example, the group of coil modules operate in two independent phase configurations. Additionally, the system 100 can repeat this structure for the polar region across multiple (e.g., n-number of) polar regions about the set of coil modules 112.

In this implementation, the system 100 can then: independently drive (e.g., via a primary bridge circuit) a first current (e.g., 100 amps) through the primary set of coil modules (e.g., three coil modules) to induce magnetic coupling between the primary set of coil modules and the tunnel segment; and independently drive (e.g., via a secondary bridge circuit) a second current (e.g., 100 amps) through the secondary set of coil modules (e.g., three coil modules) to induce magnetic coupling between the secondary set of coil modules and the tunnel segment. Accordingly, the system 100 can independently drive a current through each set of coil modules (e.g., n-set of coil modules) in a polar region to induce magnetic coupling between coil modules in the polar region and the corresponding tunnel segment of the magnetic tunnel.

Therefore, multiple coil modules (e.g., n-coil modules) within a polar region can operate in a particular independent phase configuration in order to concurrently couple a tunnel segment of the radial magnetic tunnel 131.

5.3.3 Overlapping Independent Two-Phase Operation

In one implementation, the system 100 includes: a first tunnel segment 138 defining a first magnetic polarity (e.g., north polarity) enveloping the set of coil modules 112; and a first subset of coil modules formed of a first grouping of independent phase configurations (e.g., first phase configuration, second phase configuration, and third phase configurations). The system 100 also includes a second subset of coil modules: arranged adjacent the first subset of coil modules, formed by a second grouping of independent phase configurations (i.e., fourth phase configuration, fifth phase configuration, and sixth phase configuration); and configured to magnetically couple (i.e., except during polarity switching) the first tunnel segment 138 concurrent the first subset of coil modules.

In one example, during operation the system 100 can: at an initial time, align the first subset of coil modules to a periphery of the first tunnel segment 138; and, at a first time, drive current in a first direction through the first subset of coil modules to induce magnetic coupling between the first subset of coil modules and the first tunnel segment 138, thus rotating the first subset of coil modules through the first tunnel segment 138. At a second time following the first time the system 100 can: drive current in the first direction through the second subset of coil modules concurrent with the first subset of coil modules; and induce magnetic coupling between the second subset of coil modules and the first tunnel segment 138, thereby rotating the second subset of coil modules through the first tunnel segment 138.

In this example, each of the first subset of coil modules and the second subset of coil modules: concurrently and magnetically couple the first tunnel segment 138; and induce rotation of the first subset of coil modules and the second subset of coil modules through the first tunnel segment 138 into a second tunnel segment 139 of a second polarity (e.g., south polarity), opposite the first polarity. The system 100 can then: detect the first subset of coil modules exiting the first tunnel segment 138 and entering the second tunnel segment 139, such as via a position sensor interposed between the first tunnel segment 138 and the second tunnel segment 139; and, in response to detecting the first subset of coil modules exiting the first tunnel segment 138, at a third time following the second time, drive current in a second direction, opposite the first direction, to induce magnetic coupling between the first subset of coil modules and the second tunnel segment 139. Accordingly, the system 100 can: drive current in the first direction over a first time period corresponding to rotation of the first subset of coil modules from a first end to a second end of the first tunnel segment 138; and drive current in the first direction over a second time period, concurrent the first time period, corresponding to rotation of the second subset of coil modules from the first end to the second end of the first tunnel segment 138.

Similarly, as the first subset of coil modules enters the second tunnel segment 139, the system 100 can: at a third time following the second time, drive current in a second direction-opposite the first direction-across the first subset of coil modules to induce magnetic coupling between the first subset of coil modules and the second tunnel segment 139; and, at a fourth time following the third time, drive current in the second direction across the second subset of coil modules to induce magnetic coupling between the second subset of coil modules and the second tunnel segment 139 concurrent the first subset of coil modules. The system 100 can then: drive current in the second direction over a third time period, following the first time period, corresponding to rotation of the first subset of coil modules from a first end to a second end of the second tunnel segment 139; and drive current in the second direction over a fourth time period, following the second time period and concurrent the third time period, corresponding to rotation of the second subset of coil modules from the first end and the second end of the second tunnel segment 139. Therefore, the system 100 can repeat this process to: induce concurrent and magnetic coupling of a set of tunnel segments and subsets of independent phase coil modules to actuate rotation of the set of magnetic elements 132—and therefore the shaft 170—about the set of coil modules 112; and reduce supply voltage by distributing the supply voltage across the set of coil modules 112 while maintaining a target output torque.

5.3.4 Overlapping Independent Three-Phase Operation

In one implementation, the system 100 includes: a first tunnel segment 138 defining a first magnetic polarity (e.g., north polarity) enveloping the set of coil modules 112; and a first subset of coil modules formed of a first grouping of independent phase configurations (e.g., two phase independent coil modules). The system 100 also includes: a second subset of coil modules formed of a second grouping of independent phase confutations (e.g., two phase independent coil modules) arranged adjacent the first subset of coil modules; and a third subset of coil modules formed of a third grouping of independent phase configurations (e.g., two phase independent coil modules) arranged adjacent the second subset of coil modules. In this implementation, the system 100 includes each of the first subset of coil modules, the second subset of coil modules, and the third subset of coil modules: cooperating to form a three-phase grouping configuration; and configured to concurrently magnetically couple the first tunnel segment 138 to induce rotation of the set of the magnetic elements about the set of coil modules 112.

In one example, the system 100 can, during a first time period: at an initial time during the first time period, align the first subset of coil modules to a periphery of the first tunnel segment 138; and, at a first time following the initial time, drive current in a first direction through the first subset of coil modules to induce magnetic coupling between the first subset of coil modules and the first tunnel segment 138, thus rotating the first subset of coil modules through the first tunnel segment 138. In this example, the system 100 can then: at a second time following the first time, drive current in the first direction through the second subset of coil modules-concurrent with the first subset of coil modules—to induce magnetic coupling between the second subset of coil modules and the first tunnel segment 138, thus rotating the second subset of coil modules through the first tunnel segment 138; and, at a third time following the second time, drive current in the first direction through the subset of coil modules-concurrent with the first subset of coil modules and the second subset of coil modules—to induce magnetic coupling between the third subset of coil modules and the first tunnel segment 138 thus rotating the third subset of coil modules through the first tunnel segment 138.

Therefore, during the first time period, the system 100 operates as a three-phase motor generator to induce rotation of the set of magnetic elements 132 about the set of coil modules 112 while reducing supply voltage distributed across the set of coil modules 112 to maintain a target output torque. As described above, the system 100 can also: include a set of coil modules 112 formed into a grouping of independent phase configurations (e.g., eight subsets of coil modules) to form a cylindrical stator ring; and concurrently (i.e., except during polarity switching) drive current in a first direction across each subset of coil modules, in the set of coil modules 112, to induce three-phase rotation for the rotor core about the cylindrical stator ring.

In another example, the system 100 forms an independent three phase system 100 of 48 coils including 16 coils assembled into each phase and 16 magnetic tunnels. In another example, the system 100 forms a two phase system 100 including 24 coil sets per phase and 24 tunnels. In yet another example, the system 100 forms an four phase system 100 including 12 coil sets per phase and 12 tunnels. Alternatively, the system 100 includes phases grouped to fire at same time (e.g., phase A and B fire at same time) forming a larger pole resulting in a different time constant for the system 100.

5.3.5 Overlapping Independent Six-Phase Operation

In another implementation, the system 100 includes: a first tunnel segment 138 defining a first magnetic polarity (e.g., north polarity) enveloping the set of coil modules 112; and a first grouping of independent phase coils (e.g., six coil modules) configured to concurrently and independently couple the first tunnel segment 138 to induce rotation about the cylindrical stator yoke 124. In this implementation, the system 100: concurrently drives current in a first direction across each coil module, in the first grouping of independent phase coils (e.g., six coil modules), to induce magnetic coupling between the coil module and the first tunnel segment 138; and induces independent phase rotation (e.g., 7.5 degrees of rotation) for each coil module, in the first grouping of independent phase coils (e.g., six coil modules), through the tunnel segment.

In one example, the system 100 includes: a first set of coil modules (e.g., eight coil modules) radially arranged about the cylindrical stator yoke 124 defining a first phase configuration; a second set of coil modules (e.g., eight coil modules) radially offset (e.g., 7.5 degrees) the first set of coil modules and arranged about the cylindrical stator yoke 124 to define a second phase configuration different the first phase configuration; and a third set of coil modules (e.g., eight coil modules) radially offset (e.g., 7.5 degrees) the second set of coil modules and arranged about the cylindrical stator yoke 124 to define a third phase configuration different from the first phase configuration and the second phase configuration. Similarly, the system 100 includes: a fourth set of coil modules (e.g., eight coil modules) radially offset (e.g., 7.5 degrees) the third set of coil modules and arranged about the cylindrical stator yoke 124 to define a fourth phase configuration different from the first, second, and third phase configurations; a fifth set of coil modules (e.g., eight coil modules) radially offset (e.g., 7.5 degrees) the fourth set of coil modules and arranged about the cylindrical stator yoke 124 to define a fifth phase configuration different the first, second, third, and fourth phase configurations; and a sixth set of coil modules (e.g., eight coil modules) radially offset (e.g., 7.5 degrees) from the fifth set of coil modules and arranged about the cylindrical stator yoke 124 to define a sixth phase configuration different from the first, second, third, fourth, and fifth phase configurations.

Therefore, in the aforementioned example, the system 100: includes the set of coil modules 112 forming eight groupings of six independent phase coil modules arranged about the cylindrical stator yoke 124; and concurrently (i.e., except during polarity switching)—during a first period of time-drives current in a first direction across each coil module, in the subsets of coil modules (i.e., first, second, third, fourth, fifth, and sixth subsets of coil modules) to induce rotation of the rotor 130 about the stator. Accordingly, during a first time period corresponding to rotating a first grouping of independent phase coil modules through the first tunnel segment 138, the system 100 can: over a first duration, drive current through the first subset of coil modules to induce magnetic coupling between a first coil module 113, in the first subset of coil modules, and the first tunnel segment 138; and over a second duration of time current the first duration of time, drive current through the second subset of coil modules to induce magnetic coupling between a second coil module 127, in the second subset of coil modules, and the first tunnel segment 138.

Thus, each of the first coil module 113 and the second coil module 127 concurrently and magnetically couples the first tunnel segment 138 thereby rotating the set of magnetic elements 132 about the set of coil modules 112. The system 100 can then, implement this process to independently and concurrently drive current across each of the subsets of coil modules to: induce independent magnetic coupling between the first grouping of independent phase coil modules and the first tunnel segment 138; and concurrently rotate a first grouping of independent phase coils through the first tunnel segment 138 and into a second tunnel segment 139 adjacent the first tunnel segment 138. Therefore, the system 100 can concurrently and uniformly distribute a supply voltage across the subsets of coil modules, in the set of coil modules 112, while maintaining a target torque output at the electric motor (and/or electric generator).

5.4 Phase Transition

In one implementation, the system 100: drive current across the set of coil modules 112 to operate as an overlapping independent phase electric motor (and/or electric generator), as described above; and transition to a three-phase electric motor (and/or electric generator) configuration in response to detecting a motor speed exceeding a threshold motor speed.

For example, during a first time period the system 100 can: over a first duration of time, drive current through a first subset of coil modules in the set of coil modules 112 to induce magnetic coupling between the first subset of coil modules and the set of magnetic elements 132; and over a second duration of time concurrent the first duration time, drive current through a second subset of coil modules, in the set of coil modules 112, to induce magnetic coupling between the second subset of coil modules and the set of magnetic elements 132. The system 100 can then, during the first time period: read electrical signals, such as from a position sensor arranged proximal the set of coil modules 112 and/or from a multi-meter sensor reading back-EMF generated by the set of coil modules 112; interpret a first motor speed during the first time period based on the electrical signals; and in response to the first motor speed exceeding a threshold motor speed, transition operation to a three-phase electric motor (and/or electric generator).

In particular, in response to the first motor speed exceeding the threshold motor speed, the system 100 can: at a first time following the first time period, drive current through the first subset of coil modules, in the set of coil modules 112, to induce a first phase coupling between the first subset of coil modules and the set of magnetic elements 132; at a second time following the first time, drive current through the second subset of coil modules, in the set of coil modules 112, to induce second phase coupling between the second subset of coil modules and the set of elements; and at a third time following the second time, drive current through a third subset of coil modules, in the set of coil modules 112, to induce third phase coupling between the third subset of coil modules and the set of magnetic elements 132.

Therefore, the system 100 can transition between: an overlapping independent phase configuration to operate the electric motor (and/or electric generator) at a first torque output; and a three-phase configuration to operate the electric motor at a second torque, output less than the first torque output, by routing supply voltage across the subsets of coil modules in the set of coil modules 112.

5.5 Connecting Coil Modules

In one implementation, the system 100 can include a bridge circuit 191: coupling a group of coil modules, in the set of coil modules 112, corresponding to a particular independent phase configuration to the controller 190; and configured to isolate the group of coil modules from additional groups of coil modules, in the set of coil modules 112, corresponding to multiple independent phase configurations. In this implementation, the bridge circuit 191 can independently route a current (e.g., 100 amps) through the group of coil modules to induce magnetic coupling between the group of coil modules and the radial magnetic tunnel 131 in the particular phase configuration. The system 100 can then include multiple bridge circuits (e.g., n-bridge circuits) corresponding to quantity of independent phase configurations (e.g., n-independent phase configurations) implemented across the set of coil modules 112.

For example, the system 100 can include a first bridge circuit: coupled to the first coil module 113 in a first winding direction; and configured to route the first current through the first coil module 113 in the first independent phase configuration. Additionally, the system 100 can include a second bridge circuit: coupled to the second coil module 127 in the first winding direction; configured to isolate (e.g., electrically isolate) the first coil module 113 from the second coil module 127; and configured to route the second current through the second coil module 127 in the second independent phase configuration.

Therefore, the system 100 can independently and concurrently drive a current across each coil module, in a group of coil modules corresponding to a polar region, to induce magnetic coupling between the group of coil modules and a tunnel segment of the radial magnetic tunnel 131.

5.5.1 Coil Module Pattern

In one implementation, the system 100 can include a group of coil modules-corresponding to a particular independent phase configuration-coupled to a bridge circuit 191 in an alternating winding direction such that, a magnetic field orientation generated across each coil module, in the group of coil modules, complements a magnetic pole orientation of a corresponding tunnel segment in the radial magnetic tunnel 131.

For example, the system 100 can include a radial magnetic tunnel 131 including: a primary tunnel segment 138 defining a primary magnetic polarity; and a secondary tunnel segment 139 defining a secondary magnetic polarity opposite the first magnetic polarity. In this example, a group of coil modules in the set of coil modules 112 can include a primary coil module 113: arranged within the primary tunnel segment 138; and defining the particular independent phase configuration. Additionally, the group of coil modules can include a secondary coil module 127: arranged within the secondary tunnel segment 139; and defining the particular independent phase configuration.

In this example, the system 100 can include a bridge circuit 191 (e.g., H-bridge): coupled to the primary coil module 113 in a first winding direction; and coupled to the secondary coil module 127 in a second winding direction, opposite the first winding direction; and configured to route a current in a first direction through the primary coil module 113 and the secondary coil module 127.

Therefore, the system 100 can drive the current in the first direction through the primary coil module 113 and the secondary coil module 127 to induce magnetic coupling between: the primary coil module 113 and the primary tunnel segment 138 of the primary magnetic pole orientation; and the secondary coil module 127 and the secondary tunnel segment 139 of the secondary magnetic pole orientation. The system 100 can then repeat this structure across multiple groups of coil modules (e.g., n-coil modules), in the set of coil modules 112, corresponding to multiple independent phase configurations (e.g., n-independent phase configurations) in order to independently and concurrently induce magnetic coupling between the set of coil modules 112 and the radial magnetic tunnel 131.

5.6 Controller Operation

In one implementation, the system 100 can include a position sensor (e.g., encoder) arranged about a set of tunnel segments of the radial magnetic tunnel 131 and/or about a set of pole regions about the set of coil modules 112 configured to output a position of a coil module relative a proximal tunnel segment of the radial magnetic tunnel 131. In this implementation, prior to transition of a coil module from a primary tunnel segment 138 to a secondary tunnel segment 139, the system 100 can drive a primary current in a first direction through the coil module to induce magnetic coupling between the coil module and the primary tunnel segment 138. During transition of a coil module from a primary tunnel segment 138 to a secondary tunnel segment 139, the system 100 can terminate driving of the first current in the first direction across the coil module. Furthermore, following transition of a coil module from a primary tunnel segment 138 to a secondary tunnel segment 139, the system 100 can then drive a secondary current in a second direction—opposite the first direction—through the coil module to induce magnetic coupling between the coil module and the secondary tunnel segment 139.

In one example, the system 100 can include: a primary coil module 113 corresponding to a primary independent phase configuration and arranged within a primary tunnel segment 138 defining a primary magnetic pole orientation; and a secondary coil module 127 corresponding to a secondary independent phase configuration and arranged within the primary tunnel segment 138. In this example, during a first time period, the system 100 can: drive a primary current in a first direction through the primary coil module 113 to induce magnetic coupling between the primary coil module 113 and the primary tunnel segment 138; and drive a secondary circuit in the first direction through the secondary coil module 127 to induce magnetic coupling between the secondary coil module 127 and the primary tunnel segment 138.

During a second time period following the first time period, the system 100 can: read a first position value from a first position sensor interposed between the primary tunnel segment 138 and a secondary tunnel segment 139 adjacent the primary tunnel segment 138 and defining a secondary magnetic pole orientation, opposite the primary magnetic pole orientation; detect transition of the primary coil module 113 from the primary tunnel segment 138 to the secondary tunnel segment 139 based on the position value; in response to detecting transition of the primary coil module 113, terminate driving of the primary current in the first direction through the primary coil module 113; and maintain driving of the secondary current in the first direction through the secondary coil module 127 to induce magnetic coupling between the secondary coil module 127 and the primary tunnel segment 138.

In this example, during a third time period following the second time period, the system 100 can: drive the primary current in a second direction, opposite the first direction, through the primary coil module 113 to induce magnetic coupling between the primary coil module 113 and the secondary tunnel segment 139; read a second position value from the position sensor; detect transition of the secondary coil module 127 from the primary tunnel segment 138 to the secondary tunnel segment 139 based on the position value; and, in response to detecting transition of the secondary coil module 127, terminate driving of the secondary current through the secondary coil module 127.

Furthermore, during a fourth time period following the third time period, the system 100 can: maintain driving of the primary current in the second direction through the primary coil module 113 to induce magnetic coupling between the primary coil module 113 and the secondary tunnel segment 139; and drive the secondary current in the second direction through the secondary coil module 127 to induce magnetic coupling between the secondary coil module 127 and the secondary tunnel segment 139.

Therefore, the system 100 can then repeat these steps across each independent phase configuration across the set of coil modules 112 to maintain sequential coupling between each corresponding independent phase configuration and a respective tunnel segment of the radial magnetic tunnel 131.

5.7 Failure Mode Operation

In one implementation, the system 100 can: detect a failure event (e.g., ground short) across a coil module (or multiple coil modules) in the set of coil modules 112; identify a particular independent phase configuration corresponding to the failure event; terminate driving of current through the coil module in the particular independent phase configuration; and drive current through operational independent phase configurations in the set of coil modules 112 to maintain operation of the motor/generator.

In one example, the system 100 includes six groups of coil modules corresponding to six independent phase configurations in the set of coil modules 112. In this example, the system 100 can: read a set of electrical values (e.g., back emf current values) from a particular coil module, in a primary group of coil modules in the six groups of coil modules, corresponding to a primary independent phase configuration; and detect a ground short across the particular coil module based on the set of electrical values (e.g., null current values). Accordingly, in response to detecting the ground short, the system 100 can: terminate driving of current through the primary group of coil modules containing the particular coil module corresponding to the failure event; and drive current across each group of coil modules that are operational in the set of coil modules 112 (e.g., five remaining independent phase configurations) to maintain operation of the motor/generator. Thus, the system 100 can seamlessly transition from operating in a six independent phase configuration to operating in a five independent phase configuration. This transition from operating in a six independent phase configuration to a five independent phase configuration can result in decreased power output, such as from a target power output during operation of the system 100 in six independent phase configurations.

In one implementation, the system 100 can adjust (e.g., increase) current through each group of coil modules operational in the set of coil modules 112 (e.g., five remaining independent phase configurations). For example, in the six independent phase configurations, the system 100 can independently drive a primary current at a primary magnitude (e.g., 100 amps) through each group of coil modules in the set of coil modules 112 to maintain a target power output (e.g., 2.5 kilowatts). In this example, following transition to the five independent phase configurations, the system 100 can then drive a secondary current at a secondary magnitude (e.g., 115 amps), greater than the primary magnitude, through each of the group of coil modules operational in the set of coil modules 112 to maintain the target power output (e.g., 2.5 kilowatts).

Therefore, the system 100 can seamlessly transition between n-independent phase configurations-such as in response to detecting a failure event across a coil module in the set of coil modules 112—to maintain operation of the motor/generator at a target power output.

5.8 Variation: Saddle Motor

As described in U.S. Non-Provisional application Ser. No. 17/831,337, filed on 2 Jun. 2022, which is hereby included in its entirety by this reference, the system 100 can include: a cylindrical stator yoke 124 including a set of magnetic elements 132 arranged about a motor axis 105 within the cylindrical stator yoke 124; and set of coil modules 112 enveloping the cylindrical stator yoke 124—and therefore the set of magnetic elements 132—to induce rotation of the set of coil modules 112 about the set of magnetic elements 132. The system 100 can then, implement steps and methods described above to operate in an overlapping independent phase configuration.

For example, the system 100 can: include a first grouping of independent phase coils encompassing a first magnetic element exhibiting a first magnetic polarity; and concurrently drive current across the first grouping of independent phase coils to induce independent magnetic phase coupling between each coil module, in the first grouping of independent phase coils, and the first magnetic element in the cylindrical stator yoke 124. Therefore, the system 100 can: drive current across subsets of coil modules, in the set of coil modules 112, to induce independent and concurrent magnetic coupling between the subsets of coil modules and magnetic elements arranged within the cylindrical stator yoke 124; and rotate the set of coil modules 112 enveloping the set of magnetic elements 132 about a motor axis 105 at a target torque output.

In one example, the system 100 can include a set of magnetic elements 132 radially arranged about a motor axis 105 within an annular body, the annular body including a first annular segment defining a first magnetic polarity. In this example, the system 100 further includes a set of coil modules 112 arranged about the annular body and including: a primary coil module 113; and a secondary coil module 127. The primary coil module 113: envelops the first annular segment; and defines a primary independent phase configuration. The secondary coil module 127: envelops the first annular segment radially offset from the primary coil module 113; defines a secondary independent phase configuration, different from the primary independent phase configuration; and cooperates with the primary coil module 113 to define a polar region about the annular body. The system 100 can further include a controller 190 configured to: drive a primary current in a first direction through the primary coil module 113 to induce magnetic coupling between the primary coil module 113 and the primary annular segment; and drive a secondary current in the first direction through the secondary coil module 127 to induce magnetic coupling between the secondary coil module 127 and the primary annular segment. The secondary coil module 127 cooperates with the primary coil module 113 to maintain a target power output.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

I claim:
1. A system comprising:
   a set of magnetic elements:
      arranged about a motor axis; and
      forming a radial magnetic tunnel comprising a first tunnel segment defining a first magnetic polarity;
   a set of coil modules arranged within the radial magnetic tunnel and comprising:
      a first coil module:
         arranged within the first tunnel segment; and
         defining a first independent phase configuration;
      a second coil module:
         arranged within the first tunnel segment radially offset from the first coil module;
         defining a second independent phase configuration, different from the first independent phase configuration; and cooperating with the first coil module to define a first polar region about the radial magnetic tunnel; and
a controller configured to, during a first time period:
drive a first current in a first direction through the first coil module to induce magnetic coupling between the first coil module and the first tunnel segment; and
drive a second current in the first direction through the second coil module to induce magnetic coupling between the second coil module and the first tunnel segment, the second coil module cooperating with the first coil module to maintain a target power output.

2. The system of claim 1, wherein the controller is configured to:
during the first time period:
drive the first current at a first magnitude through the first coil module to induce magnetic coupling between the first coil module and the first tunnel segment; and
drive the second current at a second magnitude, approximating the first magnitude, through the second coil module to induce magnetic coupling between the second coil modules and the first tunnel segment, the second coil module cooperating with the first coil module to maintain the target power output; and
during a second time period:
read a set of electrical values from the second coil module;
detect a ground short across the second coil module based on the set of electrical values;
in response to detecting the ground short, terminate driving of the second current through the second coil module; and
drive a third current at a third magnitude, greater than the first magnitude, through the first coil module to induce magnetic coupling between the first coil module and the first tunnel segment and maintain the target power output.

3. The system of claim 1, further comprising:
a first bridge circuit:
coupled to the first coil module in a first winding direction; and
configured to route the first current through the first coil module in the first independent phase configuration; and
a second bridge circuit:
coupled to the second coil module in the first winding direction;
configured to isolate the first coil module from the second coil module; and
configured to route the second current through the second coil module in the second independent phase configuration.

4. The system of claim 1:
wherein the radial magnetic tunnel further comprises a second tunnel segment:
arranged adjacent the first tunnel segment; and
defining a second magnetic polarity opposite the first magnetic polarity of the first tunnel segment;
further comprising a first position sensor interposed between the first tunnel segment and the second tunnel segment of the radial magnetic tunnel; and
wherein the controller is configured to, during a second time period following the first time period:

read a first position value from the first position sensor;
detect transition of the first coil module from the first tunnel segment to the second tunnel segment based on the first position value;
in response to detecting transition of the first coil module, terminate driving of the first current in the first direction through the first coil module; and
maintain driving of the second current in the first direction through the second coil module to induce magnetic coupling between the second coil module and the first tunnel segment.

5. The system of claim 4, wherein the controller is configured to:
during a third time period following the second time period:
drive a third current in a second direction, opposite the first direction, through the first coil module to induce magnetic coupling between the first coil module and the second tunnel segment;
read a second position value from the first position sensor;
detect transition of the second coil module from the first tunnel segment to the second tunnel segment based on the second position value; and
in response to detecting transition of the second coil module, terminate driving of the second current in the first direction through the second coil module; and
during a fourth time period following the third time period:
maintain driving of the third current in the second direction through the first coil module to induce magnetic coupling between the first coil module and the second tunnel segment; and
drive a fourth current in the second direction, opposite the first direction, through the second coil module to induce magnetic coupling between the second coil module and the second tunnel segment.

6. The system of claim 1:
wherein the radial magnetic tunnel further comprises a second tunnel segment defining a second magnetic polarity, opposite the first magnetic polarity;
wherein the set of coil modules further comprises:
a third coil module:
arranged within the second tunnel segment; and
cooperating with the first coil module to define the first independent phase configuration;
a fourth coil module:
arranged within the second tunnel segment radially offset from the third coil module;
cooperating with the second coil module to define the second independent phase configuration; and
cooperating with the third coil module to define a second polar region, adjacent to the first polar region, about the radial magnetic tunnel; and
wherein the controller is configured to, during the first time period:
drive the first current in the first direction through the first coil module and the second coil module to induce magnetic coupling between:
the first coil module and the first tunnel segment; and
the third coil module and the second tunnel segment; and
drive the second current in the first direction through the first coil module and the second coil module to induce magnetic coupling between:
the second coil module and the first tunnel segment; and the fourth coil module and the second tunnel segment.

7. The system of claim 6, further comprising:
a first bridge circuit:
coupled to the first coil module in a first winding direction;
coupled to the third coil module in a second winding direction, opposite the first winding direction; and
configured to route the first current through the first coil module and the third coil module in the first independent phase configuration; and
a second bridge circuit:
coupled to the second coil module in the first winding direction;
coupled to the fourth coil module in the second winding direction, opposite the first winding direction; and
configured to route the second current through the second coil module and the fourth coil module in the second independent phase configuration.

8. The system of claim 1:
wherein the set of coil modules further comprises a third coil module:
arranged within the first tunnel segment radially offset from the first coil module and the second coil module;
defining a third independent phase configuration different from the first independent phase configuration; and
cooperating with the first coil module and the second coil module to define the first polar region about the radial magnetic tunnel; and
wherein the controller is configured to, during the first time period:
drive the first current at a first magnitude through the first coil module to induce magnetic coupling between the first coil module and the first tunnel segment;
drive the second current at a second magnitude, approximating the first magnitude, through the second coil module to induce magnetic coupling between the second coil module and the first tunnel segment; and
drive a third current at a third magnitude, approximating the first magnitude, through the third coil module to induce magnetic coupling between the third coil module and the first tunnel segment, the third coil module cooperating with the second coil module and the first coil module to maintain a target power output.

9. The system of claim 8, wherein the controller is configured to, during a second time period:
read a set of electrical values from the third coil module;
detect a ground short across the third coil module based on the set of electrical values; and
in response to detecting the ground short:
terminate driving of the third current through the third coil module;
maintain driving of the first current at a first magnitude, through the first coil module to induce magnetic coupling between the first coil module and the first tunnel segment; and
maintain driving of the second current at the second magnitude, approximating the first magnitude, through the second coil module to induce magnetic coupling between the second coil module and the first tunnel segment, the second coil module cooperating with the first coil module to maintain a first power output, less than the target power output.

10. The system of claim 1:
wherein the set of coil modules further comprises:
a third coil module:
arranged adjacent the first coil module within the first tunnel segment; and
cooperating with the first coil module to define the first independent phase configuration; and
a fourth coil module:
arranged adjacent the second coil module within the first tunnel segment;
cooperating with the second coil module to define the second independent phase configuration; and
cooperating with the third coil module, second coil module, and the first coil module to define the first polar region about the radial magnetic tunnel; and
wherein the controller is configured to, during the first time period:
drive the first current in the first direction through the first coil module and the third coil module to induce magnetic coupling between the first coil module, the second coil module, and the first tunnel segment; and
drive the second current in the first direction through the second coil module and the fourth coil module to induce magnetic coupling between the second coil modules, the fourth coil module, and the first tunnel segment.

11. The system of claim 1:
wherein the set of coil modules further comprises:
a third coil module:
arranged within the first tunnel segment radially offset from the first coil module and the second coil module; and
defining a third independent phase configuration different from the first independent phase configuration and the second independent phase configuration; and
a fourth coil module:
arranged within the first tunnel segment radially offset from the first coil module, the second coil module, and the third coil module; and
defining a fourth independent phase configuration different from the first independent phase configuration, the second independent phase configuration, and the third independent phase configuration; and
wherein the controller is configured to, during the first time period:
drive the first current in a first direction through the first coil module to induce magnetic coupling between the first coil module and the first tunnel segment;
drive the second current in the first direction through the second coil module to induce magnetic coupling between the second coil module and the first tunnel segment;
drive a third current in the first direction through the third coil module to induce magnetic coupling between the third coil module and the first tunnel segment; and
drive a fourth current in the first direction through the fourth coil module to induce magnetic coupling between the fourth coil modules and the first tunnel segment.

12. The system of claim 11, wherein the set of coil modules comprises:
a first subset of coil modules:
comprising a first quantity of coil modules comprising the first coil module; and
defining the first independent phase configuration; and
coupled to a first bridge circuit configured to route the first current in the first direction through the first subset of coil modules; and
a second subset of coil modules:
comprising a second quantity of coil modules:
comprising the second coil module; and
approximating the first quantity of coil modules;
defining the second independent phase configuration, different form the first independent phase configuration; and
coupled to a second bridge circuit configured to route the second current in the first direction through the second subset of coil modules.

13. The system of claim 1, wherein the first coil module comprises:
a first bobbin defining:
a first aperture; and
a first winding receiving slot about an exterior of the first bobbin;
a second bobbin:
arranged opposite the first bobbin;
defining a second aperture in alignment with the first aperture; and
defining a second winding receiving slot about an exterior of the second bobbin;
a stator pole:
formed of a ferrous material;
interposed between the first bobbin and the second bobbin; and
defining a third aperture in alignment with the first aperture and the second aperture to define a pole tunnel segment; and
a winding coiled about the first winding receiving slot and the second winding receiving slot.

14. The system of claim 1, wherein the set of magnetic elements comprises:
a subset of inner radial magnetic elements:
arranged in a first Halbach array configuration about the motor axis; and
defining a first flux density distribution focused toward an inner radial facet of the set of coil modules;
a subset of outer radial magnetic elements:
arranged in a second Halbach array configuration, in alignment with the first Halbach array configuration, about the motor axis; and
defining a second flux density distribution focused toward an outer radial facet of the set of coil modules;
a first subset of axial magnetic elements:
arranged in a third Halbach array configuration about the motor axis orthogonal to the set of inner radial magnetic elements and the set of outer radial magnetic elements; and
defining a third flux density distribution focused toward a first axial facet of the set of coil modules; and
a second subset of axial magnetic elements:
arranged opposite the first subset of axial magnetic elements in a fourth Halbach array configuration, in alignment with the third Halbach array configuration, about the motor axis;
defining a fourth flux density distribution focused toward a second axial facet, opposite the first axial facet, of the set of coil modules; and
cooperating with the subset of inner radial magnetic elements, the subset of outer radial magnetic elements, and the first subset of axial magnetic elements to form the radial magnetic tunnel enveloping the set of coil modules.

15. The system of claim 1, further comprising:
an inner rotor core:
arranged within an inner radial of the set of coil modules;
defining a set of inner slots; and
comprising a subset of inner radial magnetic elements, in the set of magnetic elements, arranged at the set of inner slots and facing an inner radial facet of the set of coil modules;
an outer rotor core comprising:
a first outer plate:
coupled to the inner rotor core;
defining a first set of outer slots; and
comprising a first subset of axial magnetic elements, in the set of magnetic elements, arranged at the first set of outer slots and facing a first axial facet of the set of coil modules;
a second outer plate:
arranged opposite the first outer plate;
defining a second set of outer slots; and
comprising a second subset of axial magnetic elements, in the set of magnetic elements, arranged at the second set of outer slots and facing a second axial facet of the set of coil modules;
an outer radial wall:
interposed between the first outer plate and the second outer plate;
defining a set of outer slots; and
comprising a subset of outer radial magnetic elements, in the set of magnetic elements, arranged at the set of outer slots and facing an outer radial facet of the set of coil modules; and
a shaft coupled to the inner rotor core and configured to rotate during magnetic coupling between the set of coil modules and the set of magnetic elements.

16. A system comprising:
a set of magnetic elements radially arranged about a motor axis within an annular body, the annular body comprising a first annular segment defining a first magnetic polarity;
a set of coil modules arranged about the annular body and comprising:
a first coil module:
enveloping the first annular segment; and
defining a first independent phase configuration;
a second coil module:
enveloping the first annular segment radially offset from the first coil module;
defining a second independent phase configuration different from the first independent phase configuration; and
cooperating with the first coil module to define a first polar region about the annular body; and
a controller configured to:
drive a first current in a first direction through the first coil module to induce magnetic coupling between the first coil module and the first annular segment; and drive a second current in the first direction through the second coil module to induce magnetic coupling between the second coil module and the first annular segment, the second coil module cooperating with the first coil module to maintain a target power output.

17. The system of claim 16, wherein the controller is configured to:
during the first time period:
drive the first current at a first magnitude through the first coil module to induce magnetic coupling between the first coil module and the first annular segment; and
drive the second current at a second magnitude, approximating the first magnitude, through the second coil module to induce magnetic coupling between the second coil modules and the first annular segment, the second coil module cooperating with the first coil module to maintain the target power output; and
during a second time period:
read a set of electrical values from the second coil module;
detect a ground short across the second coil module based on the set of electrical values; and
in response to detecting the ground short, drive a third current at a third magnitude, greater than the first magnitude, through the first coil module to induce magnetic coupling between the first coil module and the first annular segment and maintain the target power output.

18. The system of claim 16, further comprising:
a first bridge circuit:
coupled to the first coil module in a first winding direction; and
configured to route the first current through the first coil module in the first independent phase configuration; and
a second bridge circuit:
coupled to the second coil module in the first winding direction;
configured to isolate the first coil module from the second coil module; and
configured to route the second current through the second coil module in the second independent phase configuration.

19. The system of claim 16:
wherein the annular body further comprises a second annular segment:
adjacent the first annular segment; and
defining a second magnetic polarity opposite the first magnetic polarity of the first annular segment;
further comprising a first position sensor interposed between the first annular segment and the second annular segment of the annular body; and
wherein the controller is configured to, during a second time period following the first time period:
read a first position value from the first position sensor;
detect transition of the first coil module from the first annular segment to the second annular segment based on the first position value; and
in response to detecting transition of the first coil module, terminate driving of the first current in the first direction through the first coil module; and
maintain driving of the second current in the first direction through the second coil module to induce magnetic coupling between the second coil modules and the first annular segment.

20. A system comprising:
a set of magnetic elements arranged radially about a motor axis;
a set of coil modules arranged adjacent the set of magnetic elements and comprising:
a first subset of coil modules defining a first independent phase configuration; and
a second subset of coil modules:
radially offset from the first subset of coil modules; and
defining a second independent phase configuration different from the first independent phase configuration; and
a controller configured to:
during a first time period:
drive a first current at a first magnitude through the first subset of coil modules to induce magnetic coupling between the first subset of coil modules and the set of magnetic elements; and
drive a second current at the first magnitude through the second subset of coil modules to induce magnetic coupling between the second subset of coil modules and the set of magnetic elements, the second coil module cooperating with the first coil module to maintain a target power output; and
during a second time period:
read a set of electrical values from the second subset of coil modules;
detect a ground short across the second subset of coil modules based on the set of electrical values; and
in response to detecting the ground short, drive a third current at a second magnitude, greater than the first magnitude, through the first subset of coil modules to induce magnetic coupling between the first subset of coil modules and the set of magnetic elements and maintain the target power output.

* * * * *